(12) United States Patent
Shahamat

(10) Patent No.: US 11,538,317 B1
(45) Date of Patent: Dec. 27, 2022

(54) ASSOCIATING AND CONTROLLING SECURITY DEVICES

(71) Applicant: Amazon Technologies, Inc., Seattle, WA (US)

(72) Inventor: Ahmad Shahamat, Thousand Oaks, CA (US)

(73) Assignee: Amazon Technologies, Inc., Seattle, WA (US)

( * ) Notice: Subject to any disclaimer, the term of this patent is extended or adjusted under 35 U.S.C. 154(b) by 61 days.

(21) Appl. No.: 16/367,836

(22) Filed: Mar. 28, 2019

(51) Int. Cl.
*G08B 13/196* (2006.01)
*H04L 41/0813* (2022.01)
*H04L 9/40* (2022.01)
*H04L 41/084* (2022.01)

(52) U.S. Cl.
CPC . *G08B 13/19684* (2013.01); *G08B 13/19645* (2013.01); *G08B 13/19656* (2013.01); *G08B 13/19693* (2013.01); *H04L 41/0813* (2013.01); *H04L 41/0846* (2013.01); *H04L 63/08* (2013.01)

(58) Field of Classification Search
CPC ........ G08B 13/19684; G08B 13/19645; G08B 13/19656; G08B 13/19693; H04L 41/0813; H04L 41/0846; H04L 63/08
See application file for complete search history.

(56) References Cited

U.S. PATENT DOCUMENTS

| | | |
|---|---|---|
| 4,764,953 A | 8/1988 | Chern et al. |
| 5,428,388 A | 6/1995 | von Bauer et al. |
| 5,760,848 A | 6/1998 | Cho |
| 6,072,402 A | 6/2000 | Kniffin et al. |
| 6,192,257 B1 | 2/2001 | Ray |
| 6,271,752 B1 | 8/2001 | Vaios |
| 6,429,893 B1 | 8/2002 | Xin |
| 6,456,322 B1 | 9/2002 | Marinacci |
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 8/2006 | Thomas |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |

(Continued)

FOREIGN PATENT DOCUMENTS

| | | |
|---|---|---|
| CN | 2585521 | 11/2003 |
| CN | 2792061 | 6/2006 |

(Continued)

*Primary Examiner* — Mohammed S Rahaman
(74) *Attorney, Agent, or Firm* — Lee & Hayes, P.C.

(57) ABSTRACT

This application is directed to systems and techniques for configuring audio/video devices in a geographical area. For instance, a graphical user interface (GUI) may include a representation of the area as well as representations of devices installed in the area. Using the GUI, a user may associate devices to copy device settings and/or preferences from one device to another. For example, a newly-installed device can be provisioned and/or configured using data from another, previously-installed device.

21 Claims, 14 Drawing Sheets

(56) References Cited

U.S. PATENT DOCUMENTS

| | | |
|---|---|---|
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,361,011 B1* | 6/2016 | Burns .................... G06F 3/167 |
| 9,508,239 B1 | 11/2016 | Harrison et al. |
| 9,736,284 B2 | 8/2017 | Scalisi et al. |
| 9,736,291 B2* | 8/2017 | Gai ........................ H04W 4/80 |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2007/0008081 A1 | 1/2007 | Tylicki et al. |
| 2010/0225455 A1 | 9/2010 | Claiborne et al. |
| 2012/0229648 A1* | 9/2012 | Kass .................. H04N 7/181<br>348/159 |
| 2013/0057695 A1 | 3/2013 | Huisking |
| 2013/0091432 A1* | 4/2013 | Shet ................... G06F 16/73<br>715/719 |
| 2014/0267716 A1 | 9/2014 | Child et al. |
| 2014/0329507 A1* | 11/2014 | Siminoff ............ H04W 68/00<br>455/414.1 |
| 2015/0035987 A1 | 2/2015 | Fernandez |
| 2015/0163463 A1 | 6/2015 | Hwang et al. |
| 2017/0068419 A1* | 3/2017 | Sundermeyer ....... G08B 25/14 |
| 2018/0174413 A1* | 6/2018 | Siminoff ............ H04N 7/186 |
| 2021/0035424 A1* | 2/2021 | Yamakawa ....... G06K 9/00771 |

FOREIGN PATENT DOCUMENTS

| | | |
|---|---|---|
| EP | 0944883 | 9/1999 |
| EP | 1480462 | 11/2004 |
| GB | 2286283 | 8/1995 |
| GB | 2354394 | 3/2001 |
| GB | 2400958 | 10/2004 |
| JP | 2001103463 | 4/2001 |
| JP | 2002033839 | 1/2002 |
| JP | 2002125059 | 4/2002 |
| JP | 2002342863 | 11/2002 |
| JP | 2002354137 | 12/2002 |
| JP | 2002368890 | 12/2002 |
| JP | 2003283696 | 10/2003 |
| JP | 2005341040 | 12/2005 |
| JP | 2006147650 | 6/2006 |
| JP | 2006262342 | 9/2006 |
| JP | 2009008925 | 1/2009 |
| WO | WO9839894 | 9/1998 |
| WO | WO0113638 | 2/2001 |
| WO | WO0193220 | 12/2001 |
| WO | WO03028375 | 4/2003 |
| WO | WO03096696 | 11/2003 |
| WO | WO2006038760 | 4/2006 |
| WO | WO2007125143 | 11/2007 |

* cited by examiner

ASSOCIATING AND CONTROLLING SECURITY DEVICES

BACKGROUND

Home security is a concern for many homeowners and renters. Those seeking to protect or monitor their homes often wish to have video and audio communications with visitors, for example, those visiting an external door or entryway. A/V recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

BRIEF DESCRIPTION OF THE DRAWINGS

The various embodiments of the present associating and controlling security devices now will be discussed in detail with an emphasis on highlighting the advantageous features. These embodiments depict the novel and non-obvious associating and controlling security devices, as shown in the accompanying drawings, which are for illustrative purposes only. These drawings include the following figures, in which like numerals indicate like parts.

DETAILED DESCRIPTION

Figure 1A:
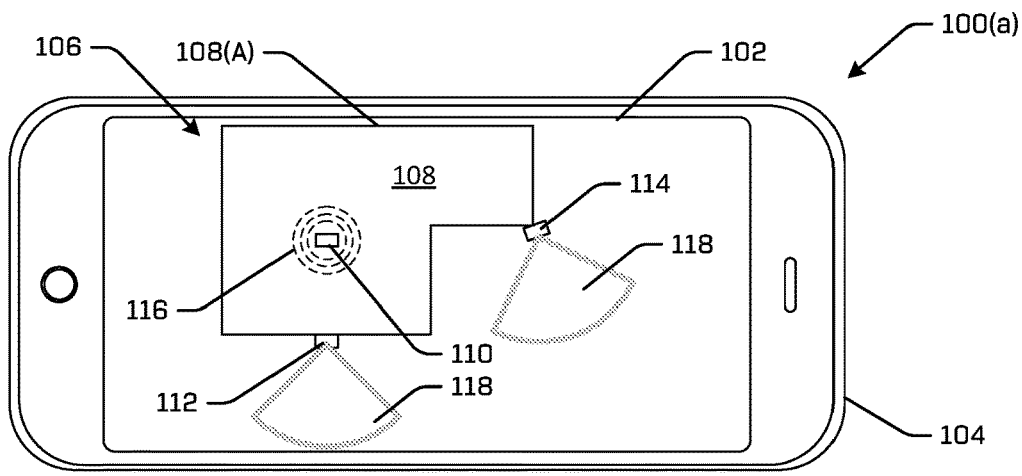
FIGS. 1A-1C are visual representations illustrating example embodiments of graphical user interfaces (GUIs) for associating security devices according to various aspects of the present disclosure.

The various embodiments of the present disclosure describing associating and controlling security devices have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that security systems and audio/video recording and communication devices ("A/V devices"), such as video doorbells, floodlight controllers, and security cameras, can make neighborhoods safer. For example, audio data and/or image data generated by an A/V device can be uploaded to the cloud and recorded on a remote server. As another example, sensor data generated by sensors and/or automation devices of a security system can capture break-ins, perimeter breaches, and/or other suspicious activity. Subsequent review of the audio data, image data, and/or sensor data may aid law enforcement in capturing perpetrators of home burglaries and other crimes. Further, the presence of one or more A/V devices on the exterior of a home, such as a doorbell unit at the entrance to the home, acts as a powerful deterrent against would-be burglars. Moreover, proper association of multiple devices, e.g., by sharing data, relating functionality of multiple devices, or the like, may further enhance security systems. However, while security devices, including A/V devices, enhance safety at a property, the installation of such devices and the coordination of multiple devices is often complicated for a homeowner. This perceived complication may lead to inefficient registration, arrangement, and/or use of security devices on the property and/or may serve as a deterrent to installing the device(s) in the first instance.

The present embodiments solve these problems, for example, by determining security devices installed in a geographic area, e.g., at a property, and configuring those devices and/or assisting a user in configuring those devices to provide enhanced security. For example, a client device (may also be referred to as "user device") may receive data representing installation locations of the security devices. The client device may then display a visual representation of the property along with representations of each of the security devices at the installation locations. A user may then use the client device to create associations between the security devices and/or to update settings of the security devices. For example, the client device may receive an input indicating an association between a first security device and a second security device. In response, the client device may cause one or more signals to be transmitted to the first security device, the second security device, and/or a hub device, where the signal(s) indicate(s) the association. Additionally, the client device may receive an input associated with updating settings of the first security device. In response, the client device may cause one or more signals to be to be transmitted to the first security device, the second security device, and/or a hub device, where the signal(s) indicate(s) the updated settings. As such, the user is able to quickly and easily create associations between the security devices as well as update settings of the security devices. The present embodiments thus facilitate the proper registration and coordination of the security devices on the property, thereby making it more likely that consumers will purchase and install such devices, which in turn creates safer neighborhoods.

The present disclosure describes, in part, configuring and controlling security devices installed at a location. Many homes, businesses, and other structures use sensing devices for security. For example, sensing devices may include audio/video (A/V) recording and communication devices (also referred to herein as A/V devices), such as motion activated cameras, security cameras, floodlight cameras, and the like. These devices generally have associated field(s) of view (e.g., a field of view of a camera and/or a field of view of a motion sensor) trained on at least a portion of a property. In conventional use, the A/V devices may record video upon detecting someone or something in one or more of the field(s) of view. While security devices, including A/V devices, increase safety at a property, e.g., by capturing nefarious or unwanted activity and/or deterring such activity in the first instance, installation of such devices can be burdensome. Moreover, while it may be beneficial to coordinate functionality, settings, and/or communication between and among multiple devices, such coordination is often even more difficult than installation.

Examples in the present disclosure solve these problems by aiding a user (e.g., a homeowner) with setup of a new security device. For example, embodiments described herein may recognize a newly-installed security device, e.g., via a wired or wireless (e.g., Bluetooth, Bluetooth Low Energy (BLE), etc.) transmission from the device. For example, upon powering on, a new security device may broadcast a signal for identification by other devices in the area. When this signal is detected by another device in the area, embodiments may include a representation of the new device on a visual representation, e.g., a property map, on a display of a client device associated with a user. For example, the property map may include visual representations of physical features of the property, e.g., building outlines and/or a perimeter of the property, representations of devices already installed at the property, and/or a representation of the newly-installed device.

The property map may be presented, e.g., via a graphical user interface on the client device, as a visual representation of a geographic area or location. The visual representation may include one or more buildings in the geographic area. In various embodiments, property lines, building outlines, icons, schematics, etc. may be obtained from public sources, such as one or more map applications, including Google Maps, Apple Maps, or Google Earth. The visual representation may further include one or more A/V devices in the geographic area (e.g., illustrated as graphical representations on or within the buildings or property lines in which they are located). The visual representation may further include one or more fields of view associated with the A/V devices (e.g., illustrated as graphical representations extending from the A/V device(s) outward in the direction of the field of view), where installation orientations of security devices are known and/or based on an estimate, such as by comparing the name of the device (e.g., front door camera) with the schematic (e.g., the field of view extends from the front of house outward based on determining the front of the house and the name "front door camera"). For example, the representations of the already-installed devices and/or the representation of the newly-installed device may be displayed as icons with which a user may interact (e.g., via a touch screen on the electronic device).

In some embodiments, the user may interact with the representations of the security devices to configure the newly-installed device. For example, the user may associate the newly-installed device with an already-installed device to indicate an intent to associate the two devices. In some examples, the user may drag an icon associated with the newly-installed device into the proximity of an icon associated with an already-installed device. In other embodiments, the user may serially select (e.g., select in succession) the icons representing the newly-installed device and the already-installed device(s).

Once the newly-installed device is associated with the already-installed device, signals may be sent to the newly-installed device and/or the already installed device(s) to configure the respective device(s). For example, when the newly-installed device is a surveillance device and the already installed device is a hub device, embodiments of this disclosure may configure the newly-installed device to communicate with the hub device over a network, such as a wireless local area network. Some embodiments may provision the newly-installed device, e.g., by authenticating the newly-installed device with a provisioning service and/or with the hub device. Some embodiments may also provide the newly-installed device with an identification of a network, such as a Wi-Fi network, and/or with credentials to join the network, e.g., a password or the like. In further embodiments, techniques described herein may configure settings of the newly-installed device according to preferences for the property. Accordingly, embodiments of this disclosure may streamline setup of newly-installed devices for a user.

Techniques described herein may also be useful to manage settings of devices once installed. For example, a user may be able to access a map of her property at any time, e.g., via a graphical user interface (GUI) on the client device, to see a current layout of security devices. From the GUI, the user may select icons associated with individual devices to access settings and/or controls associated with each device. Moreover, techniques described herein may allow the user to enhance cooperation of already-installed devices. For example, via the GUI, the user may associate two devices. In some embodiments, the user may select and drag an icon associated with a first installed device into proximity with an icon associated with a second installed device. In additional embodiments, the user may serially select two (or more) devices for association.

Techniques described herein may, upon this association, provide an updated GUI with user interface elements that allow the user to configure an association between the devices. For example, the user may be able to control the second device to begin capturing video, to illuminate a light source, and/or to output audio when the first device senses motion. In additional examples, the user may also be able to configure wireless networking between the devices. In other examples, the property owner may be able to copy settings from the first device to the second device, or vice versa.

Thus, embodiments of this disclosure provide increased control, flexibility, and/or ease for configuring security devices, thereby making the public safer, in addition to enhancing the safety and security of the resident's property, family, and pets, as well as the safety and security of the geographic area (e.g., a neighborhood). According to embodiments of this disclosure, and as described herein, techniques may promote control and coordination of security devices to improve functionality of the devices, to enhance the user experience, and/or to increase safety.

The following detailed description describes the present embodiments with reference to the drawings. In the drawings, reference numbers label elements of the present embodiments. These reference numbers are reproduced below in connection with the discussion of the corresponding drawing features.

Figure 1B:
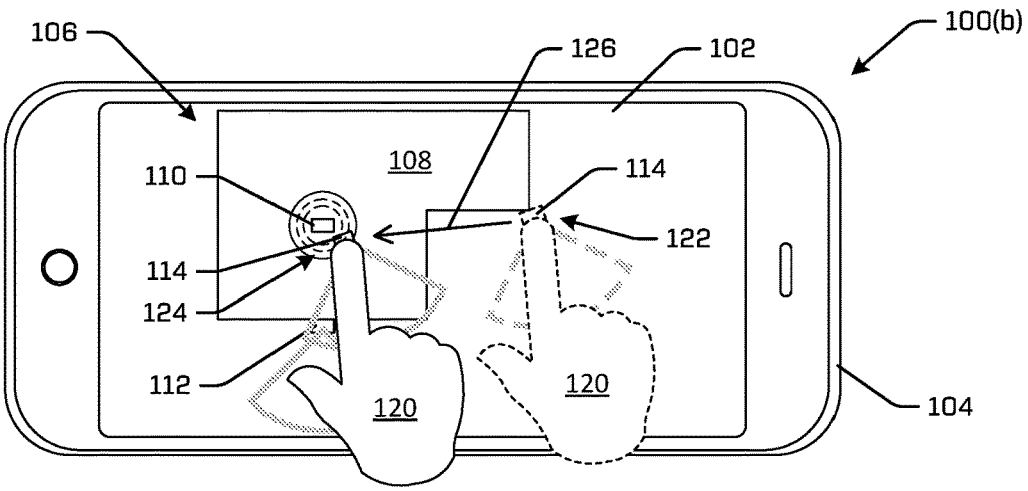
Figure 1C:
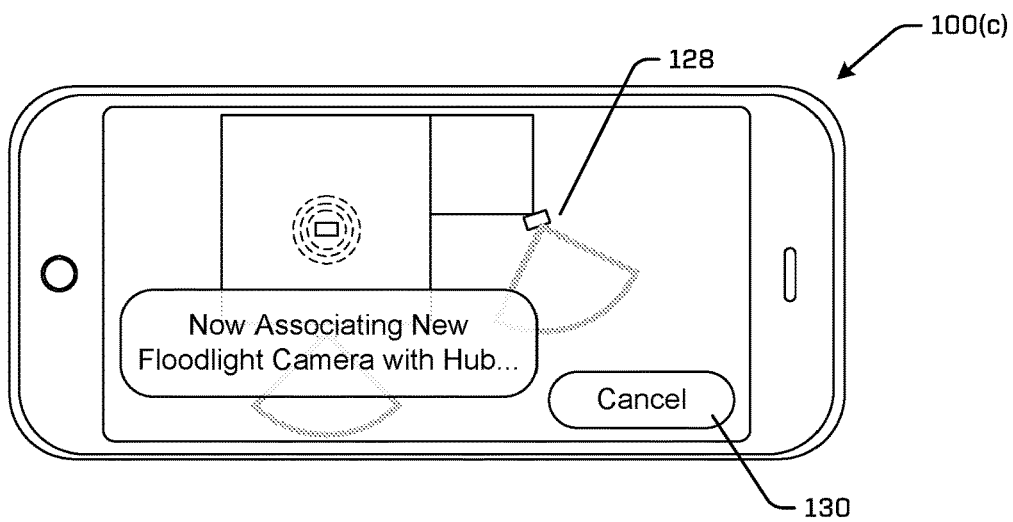

FIGS. 1A-1C are schematic diagrams of graphical user interfaces (GUIs) 100(a), 100(b), 100(c) illustrating examples of configuring and controlling security devices. As illustrated in FIG. 1A, the GUI 100(a) is provided on a display 102, e.g., a touchscreen display, of an electronic device 104, which may be a client device or user device, such as a tablet computer or a smartphone. The GUI 100(a) includes a visual representation 106 generally embodied as a map of a property. In the illustrated example, the visual representation 106 is an overhead visual representation of a property or geographic area at which one or more security devices are installed. The visual representation 106 includes a building representation 108 and security device representations 110, 112, 114. While the illustrated visual representation 106 may only include the building representation 108 and the security device representations 110, 112, 114, other embodiments may include additional feature representations, such as other features of the geographic area, including roads, trees, or the like, and/or boundary lines between properties.

The building representation 108 generally comprises a footprint or outline 108(A) that demarcates an area on the property that is occupied by a building structure, such as a house, garage, and/or the like, and is defined by the perimeter of the structure. The security device representations 110, 112, 114 are illustrated at locations relative to the building representation 108 at which security devices are located on the property. For example, the representation 110 may represent a hub device disposed inside the building, e.g., at a centrally-located position in the building. For example, when the building is a house, the hub device may be a device at which people in the home may check status of other security devices, control aspects of one or more of the security devices, and/or play back video and/or audio captured by security devices. Hub devices are discussed in more detail herein. Also in the example visual representation 106, the representation 112 may represent a video doorbell disposed on an exterior of the building, e.g., proximate a front door of the building. For example, the video doorbell may include conventional doorbell functionality, e.g., a button that, when pressed, causes an audible sound to be played inside the building, as well as a camera for generating image data representing the person pressing the button. Video doorbells are discussed in more detail herein. Also in the example visual representation 106, the representation 114 may represent a floodlight camera disposed on an exterior of the building, e.g., at a position to illuminate a portion of the property, such as a sidewalk, driveway, or the like. For example, the floodlight camera may include one or more light sources and a camera for generating image data and/or audio data. In some embodiments, the floodlight camera may have a motion sensor, such that the light source(s) illuminate(s) and/or the camera begins generating and/or transmitting the image data and/or the audio data when motion is detected. Floodlight cameras are discussed in more detail herein.

Thus, in the illustrated GUI 100(a) of FIG. 1A, a user of the electronic device 104 can see a map of her property with graphical representations 108, 110, 112 of security devices at installation locations on the property. The appearance of the graphical representations 108, 110, 112 may vary depending upon the type of security device that each represents. For example, the graphical representation 110 may include concentric circles 116, which may denote that the graphical representation 110 is of a hub device. The graphical representations 112, 114 may include field of view representations 118. While in some aspects of the present embodiments the field of view representations 118 are demonstrative of the coverage area, or range, of the video cameras of the devices (e.g., the video doorbell of the representation 112 and/or the floodlight camera of the representation 114 used as examples above), in other embodiments, these fields of view may show the coverage area (or monitoring range) of one or more motion sensors (e.g., passive infrared (PIR) sensors) of the A/V devices. In yet other embodiments, for some or all of the A/V devices, both the coverage area of the sensors and the coverage area of the video cameras may be displayed on the GUI 100(a). Alternatively, the field of view representations 118 may be merely representative, e.g., of a general direction, of a field of view associated with the installed devices. By way of non-limiting example, the fields of view may extend much farther from the respective devices than illustrated. In some examples, the shapes and/or extents of the representations of the fields of view 118 may be determined based on A/V device data.

The graphical representation 106 may be generated using map data. For example, map data for the geographic area, in some of the present embodiments, may be requested and received from a vendor (e.g., a third-party vendor, such as Google Maps, Google Earth, Apple Maps, etc.) of such data. In some embodiments, the data for land parcels may be received from a first vendor (e.g., city, state, and/or local offices, such as permitting offices), while the data for the building footprints may be received from a second, different vendor (e.g., a construction company, a builder, etc.). In other embodiments, the data for land parcels may be received from the same vendor as the data for the building footprints. In some examples, map data may be used to provide a general layout of the map, whereas device data may be used to augment the map data, e.g., by informing locations of the security device representations 110, 112, 114.

One or more of the representations 110, 112, 114 may be interactive icons. More specifically, a user may be able to interact with (e.g., manipulate) the representations 110, 112, 114 via the electronic device 104. For example, when the display is a touch-sensitive display, a user may be able to touch the representations 110, 112, 114 on the display 102. In other embodiments, the user may otherwise interact with the representations 110, 112, 114, e.g., via voice command, external input devices, or the like. In examples of this disclosure, interaction with the representations 110, 112, 114 may facilitate configuration and/or control of the devices represented by the representations 110, 112, 114.

FIG. 1B illustrates one example of configuring devices using the representations 110, 112, 114. In the example of FIG. 1B, the floodlight camera associated with the representation 114 may be a newly-installed security device. For example, the homeowner associated with the property depicted by the visual representation 106 may have recently mounted and powered on the floodlight camera. Upon power-up, the floodlight camera may transmit a signal, e.g., a beacon or other signal, that is recognizable by an application running on the electronic device 104. Upon receiving the signal, the application may cause the electronic device 104 to display the visual representation 106, including the representation 114 of the newly-installed floodlight camera. For example, the representation 114 may be positioned according to GPS information (or other location data) transmitted with the signal, or in other examples the user may be prompted to position the representation 114 at an approximate location. In still further examples, the representation 114 may merely be shown on the GUI 100(*a*) at a generic position. In some such embodiments, only after association (as described herein) may information necessary to determine the location of the newly-acquired device be available to properly position the representation 114.

In some embodiments, a user may interact with the visual representation 106, e.g., by selecting one of the graphical representations 110, 112, 114. In the scenario illustrated in FIG. 1B, a user 120 desires to associate the new floodlight camera, represented by the representation 114, with the hub device represented by the graphical representation 110. For example, the user may desire to cause the newly-installed device to communicate with the hub device over a shared network, such as a local wireless network. The user may also, or alternatively, desire to provision the newly-installed device, e.g., by authenticating the floodlight camera with the hub device or with a backend device with which the hub device is associated. In additional example embodiments, the user may desire to apply settings, preferences, or the like from the already-installed device to the newly-installed device (e.g., by configuring the floodlight camera to have some or all of the same settings as the hub device in the example). Moreover, in embodiments described herein, the hub device may include a touch screen or other user interface, and associating the floodlight camera with the hub device may allow the user to control aspects of the floodlight camera at the hub, to view video captured by the floodlight camera at the hub, or the like. For example, the hub device may display graphical user interfaces like the GUI 100(*a*) when the floodlight camera is associated with the hub device.

As illustrated in FIG. 1B, the user 120 may associate the floodlight camera with the hub device by selecting the graphical representation 114 and moving or "dragging" the representation from its original position 122 to a second position 124 proximate the hub device representation 110, e.g., generally in the direction of the arrow 126. This dragging movement of the user's finger across the display 102 may comprise receiving, via the display 102, a plurality of touch inputs, each of the plurality of touch inputs being along a path from the original position 122 to the second position 124. As the user 120 moves the representation 114, an altered (relative to the GUI 100(*a*)) GUI 100(*b*) presents the representation 114 in the second position 124. Once the representation 114 is "released" by the user 120, e.g., by the user disengaging the display 102 with the representation 114 moved to the second position 124, the display 102 may be updated to display the GUI 100(*c*). As illustrated, the GUI 100(*c*) may include a text window 128 indicating to the user that the user's action of dragging the graphical representation 114 has resulted in actions being taken to associate the floodlight camera with the hub device. The GUI 100(*c*) may also include an interactive control element 130, which may allow the user to terminate the associating action.

In embodiments of this disclosure, the associating of the floodlight camera with the hub device may cause the electronic device 102 to transmit signals to and/or receive signals from one or both of the floodlight camera and the hub device, e.g., using wireless communications, to facilitate the associating of the newly-installed floodlight with the hub device. For example, the electronic device 104 (and/or a network device) may transmit (or instruct the floodlight camera to transmit) information about the floodlight camera to the hub device, including, but not limited to, device identification data, information about communication protocols of the floodlight camera, e.g., Bluetooth, Wi-fi, or the like. In instances in which associating the floodlight camera with the hub device includes provisioning the floodlight camera, the user device 104 may facilitate such provisioning. For example, the electronic device 104 (and/or a network device) may transmit (or instruct a processor at the floodlight camera to transmit) device information, such as information associated with a key or certificate, to a network device, e.g., at a backend server or remote server, which may be associated with the manufacturer of the floodlight camera. The network device may authenticate the floodlight camera, e.g., by validating or authenticating the key or certificate, and transmit information about the floodlight camera to the hub device. Upon receipt, the hub device may store the information about the floodlight camera, e.g., in a database. The network device may also facilitate data sharing between the floodlight camera and the hub device, e.g., by configuring the floodlight camera to transmit information directly to the hub device. For example, the network device may provide information to the floodlight camera and/or the hub device that identifies a network over which the devices can communicate. In other examples, upon authenticating the floodlight camera, the hub device may transmit user preferences, network settings, and/or other preferences and/or settings to the floodlight camera. For example, the network device may have information about user preferences associated with the property, e.g., preferences associated with battery conservation settings, notifications the property owner may prefer to receive, or the like. In some examples, these preferences may be transmitted as signals to the floodlight camera, which signals may be received at the floodlight camera, with the floodlight camera updating settings/preferences based on the signals.

In the example illustrated in FIGS. 1A-1C, installed devices are associated when a user "drags" the graphical representation 114 to the second location 124 in proximity of the graphical representation 110. Other embodiments of this disclosure may facilitate association of devices in a different manner. For instance, the GUI 100(*a*) may facilitate serial selection of the graphical representation 110, 112, 114 that the user would like to associate. For example, upon receiving a first user input comprising a selection of the graphical representation 114 and then, in close temporal proximity, e.g., up to about 1 or 2 seconds, thereafter, a second user input comprising a selection of the graphical representation 110 of the hub device, the electronic device 104 may begin associating the devices, as on the GUI 100(*c*). In another implementation, upon receiving a signal corresponding to a user selection of one of the graphical representations 110, 112, 114, the electronic device 104 may be configured to display another GUI with which a user may interact to make the association. For example, the GUI (not shown) may provide the user with a list or other representation of additional devices, and prompt the user to select one or more of those devices for association with a first-selected device. In some instances, another GUI may simply prompt the user to select another graphical representation from the visual representation 106.

Figure 2:
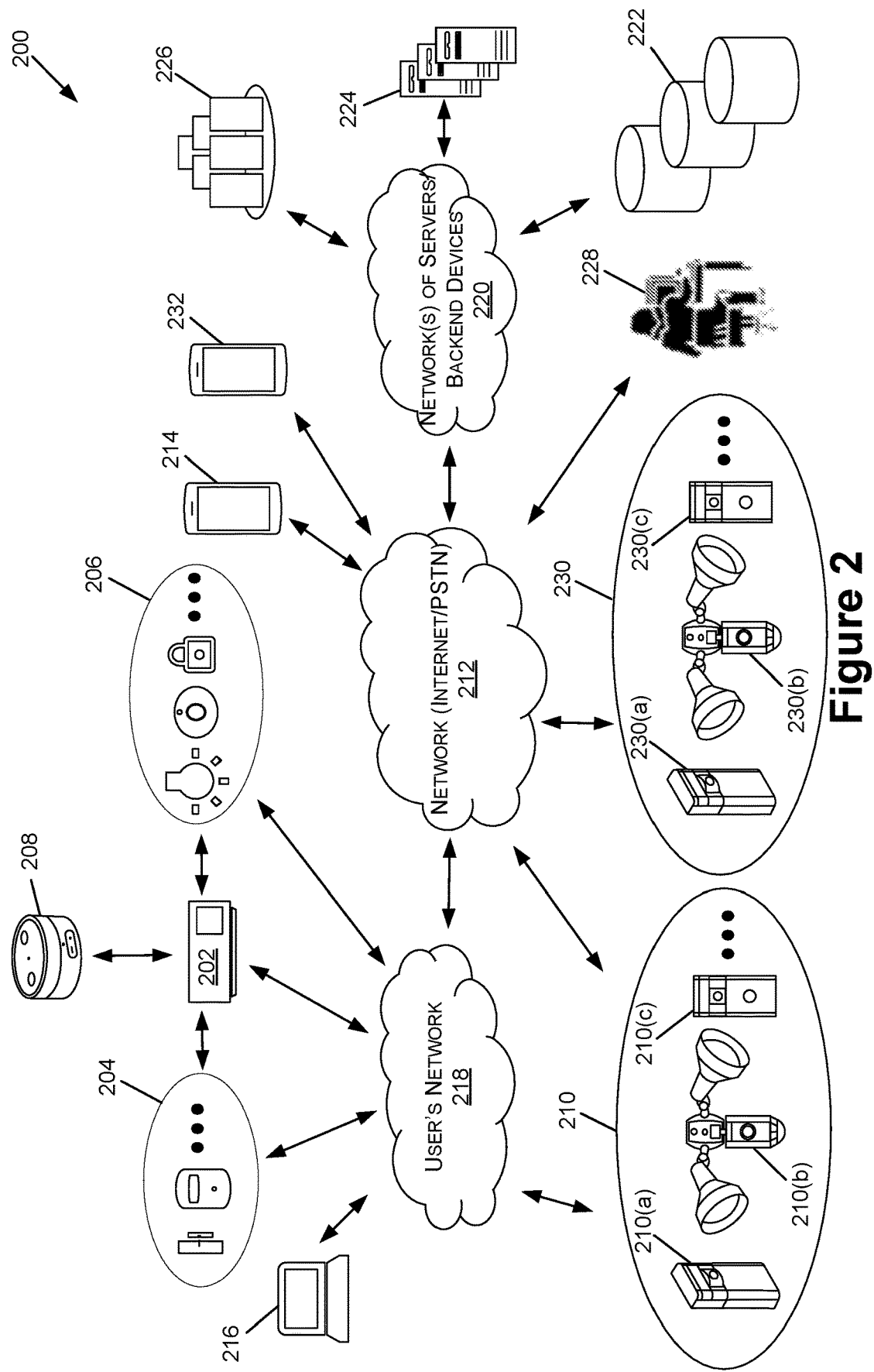
FIG. 2 is a functional block diagram illustrating a system for communicating in a network according to various aspects of the present disclosure.

FIG. 2 is a functional block diagram illustrating a system 200 for communicating in a network according to various aspects of the present disclosure. Home automation, or smart home, is building automation for the home. Home automation enable users (e.g., home owners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various embodiments, Wi-Fi is used for remote monitoring and control of such devices and/or systems. Smart home devices (e.g., hub devices 202, sensors 204, automation devices 206, a virtual assistant (VA) device 208, Audio/Video (A/V) recording and communication devices ("A/V devices") 210, an electronic device 230, light emitters 232, etc.), when remotely monitored and controlled via a network (Internet/a public switched telephone network (PSTN)) 212 (which may be similar to, and represent the network 122), may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, or an intelligent personal assistance device) from which the system may be controlled through various user interfaces, such as voice commands and/or a touchscreen. Various examples, of user interfaces may include any or all of a wall-mounted terminal (e.g., a keypad, a touchscreen, etc.), software installed on the client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the VA device 208, the sensors 204, the automation devices 206, the A/V devices 210, the electronic devices 230, the light emitters 232, and/or client devices 214, 216 may use one or more wired and/or wireless communication protocols to communicate, including, for example and without limitation, Wi-Fi (e.g., the user's network 218), X10, Ethernet, RS-485, 6LoWPAN, Bluetooth LE (BLE), ZigBee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN.

The system 200 may include one or more A/V recording and communication devices 210 (which may represent, and be similar to, the A/V device 118) (which may alternatively be referred to herein as "A/V devices 210" or "A/V device 210"). The A/V devices 210 may include security cameras 210(a), light cameras 210(b) (e.g., floodlight cameras, spotlight cameras, etc.), video doorbells 210(c) (e.g., wall powered and/or battery powered video doorbells), and/or other devices capable of recording audio data and/or image data.

The A/V devices 210 may be configured to access a user's network 218 to connect to a network (Internet/PSTN) 212 and/or may be configured to access a cellular network to connect to the network (Internet/PSTN) 212. The components and functionality of the A/V devices 210 are described in more detail below with respect to FIG. 4.

The system 200 may further include a smart-home hub device 202 (which may represent, and be similar to, the hub device 124) (which may alternatively be referred to herein as the "hub device 202") connected to the user's network 218 and/or the network (Internet/PSTN) 212. The smart-home hub device 202 (also known as a home automation hub, gateway device, or network device), may comprise any device that facilitates communication with and control of the sensors 204, automation devices 206, the VA device 208, the electronic devices 230, the light emitters 232, and/or the one or more A/V devices 210. For example, the smart-home hub device 202 may be a component of a security system and/or a home automation system installed at a location (e.g., a property, a premise, a home, a business, etc.). In some embodiments, the A/V devices 210, the VA device 208, the sensors 204, the electronic devices 230, the light emitters 232, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. In some of the present embodiments, the A/V devices 210, the VA device 208, the sensors 204, the electronic devices 230, the light emitters 232, and/or the automation devices 206 may, in addition to or in lieu of communicating with the smart-home hub device 202, communicate with the client devices 214, 216, the VA device 208, and/or one or more of components of the network of servers/backend devices 220 directly and/or indirectly via the user's network 218 and/or the network (Internet/PSTN) 212.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/or Apple Siri®. For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, the electronic devices 230, the light emitters 232, or A/V devices 210. In some embodiments, the VA device 208 is configured to process user inputs (e.g., voice commands) without transmitting information to the network of servers/backend devices 220 for processing. The VA device 208 may include at least one speaker (e.g., for playing music, for outputting the audio data generated by the A/V devices 210, for outputting the voice of a digital assistant, etc.), at least one a microphone (e.g., for receiving commands, for recording audio data, etc.), and a display (e.g., for displaying a user interface, for displaying the image data generated by the A/V devices 210, etc.). In various embodiments, the VA device 208 may include an array of speakers that are able to produce beams of sound. Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, and/or other automation devices. In some examples, the electronic devices 230 and/or the light emitters 232 may be considered automation devices and/or may be considered part of an automation device or system (e.g., an outdoor lighting system, an indoor lighting system, and indoor/outdoor lighting system, etc.).

As described herein, in some of the present embodiments, some or all of the client devices 214, 216, the A/V device(s) 210, the smart-home hub device 202, the VA device 208, the sensors 204, the automation devices 206, the electronic devices 230, and/or the light emitters 232 may be referred to as a security system and/or a home-automation system. The security system and/or home-automation system may be installed at location, such as a property, home, business, or premises for the purpose of securing and/or automating all or a portion of the location.

The system 200 may further include one or more client devices 214, 216 (which may represent, and/or be similar to, the client device 104). The client devices 214, 216 may communicate with and/or be associated with (e.g., capable of access to and control of) the A/V devices 210, a smart-home hub device 202, the VA device 208, sensors 204, automation devices 206, and/or the electronic devices 230. In various embodiments, the client devices 214, 216 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some embodiments, the client devices 214, 216 includes a connected device, such as a smart watch, Bluetooth headphones, another wearable device, or the like. In such embodiments, the client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 210, the hub device 202, the VA device 208, the automation devices 206, the sensors 204, the electronic devices 230, the light emitters 232, and/or the client devices 214, 216 may also communicate, via the user's network 218 and/or the network (Internet/PSTN) 212, with network(s) of servers and/or backend devices 220, such as (but not limited to) one or more remote storage devices 222 (may be referred to interchangeably as "cloud storage device(s)"), one or more backend servers 224, and one or more backend application programming interfaces (APIs) 226. While FIG. 2 illustrates the storage device 222, the backend server 224, and the backend API 226 as components separate from the network 220, it is to be understood that the storage device 222, the backend server 224, and/or the backend API 226 may be considered to be components of the network 220. For example, the network 220 may include a data center with a plurality of computing resources used to implement the storage device 222, the backend server 224, and the backend API 226.

The backend server 224 may comprise a computer program or other computer executable code that, when executed by processor(s) of the backend server 224, causes the backend server 224 to wait for requests from other computer systems or software (clients) and provide responses. In an embodiment, the backend server 224 shares data and/or hardware and/or software resources among the client devices 214, 216. This architecture is called the client-server model. The client devices 214, 216 may run on the same computer or may connect to the backend server 224 over the network (Internet/PSTN) 212 and/or the network 220. Examples of computing servers include database servers, file servers, mail servers, print servers, web servers, game servers, and application servers. The term server may be construed broadly to include any computerized process that shares a resource to one or more client processes.

The backend API 226 may comprise, for example, a server (e.g. a real server, or a virtual machine, or a machine running in a cloud infrastructure as a service), or multiple servers networked together, exposing at least one API to clients. In various embodiments, the backend API 226 is provided by servers including various components such as an application server (e.g. software servers), a caching layer, a database layer, or other components suitable for implementing one or more APIs. The backend API 226 may, for example, comprise a plurality of applications, each of which communicate with one another using one or more public APIs. In some embodiments, the backend API 226 maintains user data and provides user management capabilities, thereby reducing the load (e.g., memory and processor consumption) of the client devices 214, 216.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The backend API 226 illustrated in FIG. 2 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the backend server 224) running on one or more computers (such as a dedicated server computer offering multiple services) and accessed via a network by client components running on other devices (e.g., client devices 214, 216). However, the client and server components can both be run on the same machine.

Clients and servers may have a user interface, and sometimes other hardware associated with them.

The network 220 may be any wireless network, any wired network, or a combination thereof, configured to operatively couple the above-mentioned components, devices, components, and/or systems as illustrated in FIG. 2. For example, the network 220 (and/or the user's network 218) (and/or the network (Internet PSTCN) 212) may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The hub device 202, the VA device 208, the electronic device 230, the A/V devices 210, any of the components of the network(s) of servers/backend devices 220 (e.g., the backend server 224, the backend API 226, the storage devices 222, etc.), and/or any other electronic device may be referred to herein as a "network device" or "network devices."

With further reference to FIG. 2, the system 200 may also include a security monitoring service 228. The security monitoring service 228 may be operated by the same company that manufactures, sells, and/or distributes the A/V devices 210, the hub device 202, the VA device 208, the electronic devices 230, the light emitters 232, the sensors 204, and/or the automation devices 206. In other embodiments, the security monitoring service 228 may be operated by a third-party company (e.g., a different company than the one that manufactured, sold, and/or distributed the A/V devices 210, the hub device 202, the VA device 208, the electronic devices 230, the light emitters 232, the sensors 204, and/or the automation devices 206). In any of the present embodiments, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, turn on and off one or more of the light emitters 232, etc.). For example, the security monitoring service 228 may operate and control their own client devices and/or network of servers/backend devices for monitoring and/or controlling security systems. In such an example, the A/V devices 210, the hub device 202, the VA device 208, the electronic devices 230, the light emitters 232, the sensors 204, and/or the automation devices 206 may communicate with the client devices and/or one or more components of the network of servers/backend devices of the security monitoring service 228 over the network (Internet/PSTN) 212 (in some embodiments, via one or more of the components of the network of backend servers/backend devices 220).

The system 200 may also include the electronic devices 230. The electronic devices 230 may be configured to control the light emitters 232 using conditions set by a user. The light emitters 232 may include at least a first type of light emitter 232($a$), a second type of light emitter 232($b$), and a third type of light emitter 232($c$). The light emitters 232 may include pathway lights, walkway lights, floodlights, spotlights, security lights, dome lights, entryway lights, garden lights, outdoor lights, indoor lights, landscape lighting, accent lighting, wall sconces, bullets, globes, and/or any other type of light emitter.

For example, the first type of light emitters 232($a$) may be configured to receive power from the electronic devices 230. To control the first type of light emitters 232($a$), the electronic devices 230 may begin to provide power to the first type of light emitters 232($a$) to activate the first type of light emitters 232($a$) and cease providing the power to deactivate the first type of light emitters 232($a$). Additionally, the second type of light emitters 232($b$) may be configured to receive power from the electronic devices 230. To control the second type of light emitters 232($b$), the electronic devices 230 may transmit first control signals to the second type of light emitters 232($b$) that are configured to cause the second type of light emitters 232($b$) to activate, and transmit second control signals to the second type of light emitters 232($b$) that are configured to cause the second type of light emitters 232($b$) to deactivate. Furthermore, the third type of light emitters 232($c$) may be configured to receive power from a source that is external to the electronic devices 230, such as a battery. To control the third type of light emitters 232($c$), the electronic devices 230 may transmit first control signals to the third type of light emitters 232($c$) that are configured to cause the third type of light emitters 232($c$) to activate, and transmit second control signals to the third type of light emitter 232($c$) that are configured to cause the third type of light emitters 232($c$) to deactivate.

In some examples, the light emitters 232 may include a string of light emitters 232. For example, where referring to a first type of light emitter 232($a$), the first type of light emitter 232($a$) may include two or more light emitter(s) 232($a$) connected together using a wire. In such an example, when the electronic device 230 begins providing power to the first type of light emitter 232($a$), the power is provided to each of the two or more light emitter(s) 232($a$) connected together within the string of light emitter(s) 232($a$). Additionally, when referring to a second type of light emitter 232($b$), the second type of light emitter 232($b$) may include two or more light emitter(s) 232($b$) connected together using a wire. The electronic device 230 may continuously be providing power to each of the two or more light emitter(s)

232(*b*), but activate and/or deactivate the two or more light emitter(s) 232(*b*) using signals, as described herein.

Figure 3:
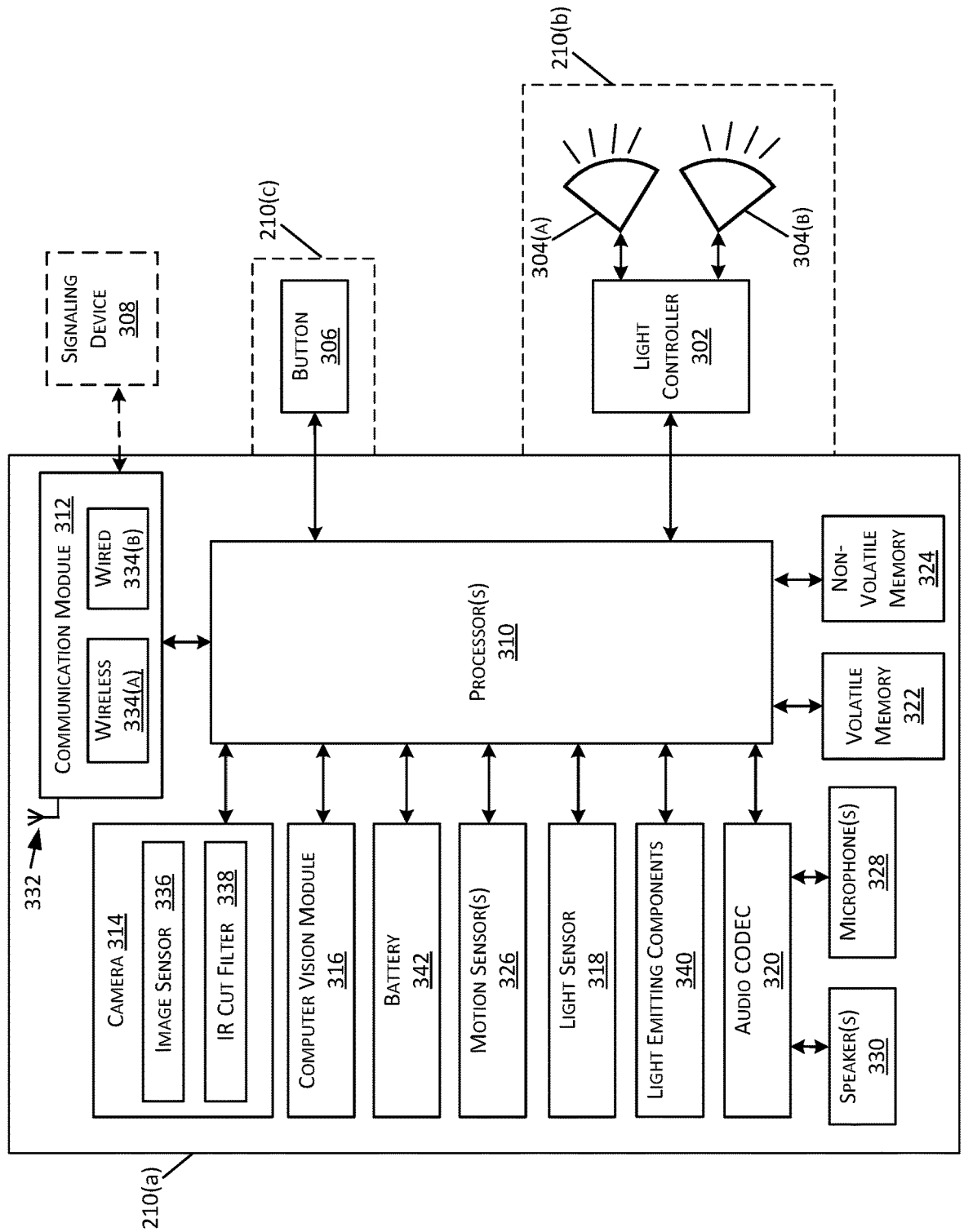
FIG. 3 is a functional block diagram of an A/V device according to various aspects of the present disclosure.

FIG. 3 is a functional block diagram for an audio/video (A/V) device according to various aspects of the present disclosure. In some embodiments, the one or more A/V devices 210 may include the security camera 210(*a*). In other embodiments, the one or more A/V devices 210 may include the light camera 210(*b*), which may include some or all of the components of the security camera 210(*a*) in addition to a light controller 302 and one or more lights 304(*a*), 304(*b*). In some embodiments, the one or more A/V devices 210 may include the video doorbell 210(*c*), which may include some or all of the components of the security camera 210(*a*) in addition to a button 306, and in some embodiments, a connection to a signaling device 308 (e.g., a pre-installed signaling device, such as a wired signaling device, and/or a wireless signaling device, connected over Wi-Fi, BTLE, or another wireless communication protocol).

With further reference to FIG. 3, the A/V device 210 may include a processor(s) 310, a network interface 312, a camera 314, a computer vision component 316, a light sensor 318, an audio CODEC (coder-decoder) 320, volatile memory 322, and non-volatile memory 324. The processor(s) 310 (alternatively referred to herein as a "CPU," a "controller," and/or a "microcontroller") may comprise an integrated circuit including a processor core, memory, and programmable input/output peripherals. The processor(s) 310 may receive input signals, such as data and/or power, from the camera 314, motion sensor(s) 326, light sensor 318, microphone(s) 328, speaker(s) 330, and/or the network interface 312, and may perform various functions as described in the present disclosure. In various embodiments, when the processor(s) 310 is triggered by the motion sensor(s) 326, the camera 314, the speaker(s) 330, the microphone(s) 328, the network interface 312, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the network interface 312 and the camera 314.

With further reference to FIG. 3, the network interface 312 may comprise an integrated circuit including a processor core, memory, and programmable input/output peripherals. The network interface 312 may be operatively connected to the processor(s) 310. In some embodiments, the network interface 312 is configured to handle communication links between the A/V device 210 and other, external devices, external receivers, external transmitters, and/or external transceivers, and to route incoming/outgoing data appropriately. For example, inbound data from an antenna 332 of the network interface 312 may be routed through the network interface 312 before being directed to the processor(s) 310, and outbound data from the processor(s) 310 may be routed through the network interface 312 before being directed to the antenna 332 of the network interface 312. As another example, the network interface 312 may be configured to transmit data to and/or receive data from a remote network device (e.g., one or more components of the network(s) of servers/backend devices 220 described in FIG. 2). The network interface 312 may include wireless 334(*a*) and wired 334(*b*) adapters. For example, the network interface 312 may include one or more wireless antennas, radios, receivers, transmitters, and/or transceivers (not shown in FIG. 3 for simplicity) configured to enable communication across one or more wireless networks, such as, without limitation, Wi-Fi, cellular, Bluetooth, Z-Wave, Zigbee, LPWAN(s), and/or satellite networks. The network interface 312 may receive inputs, such as power and/or data, from the camera 314, the processor(s) 310, the button 306 (in embodiments where the A/V device 210 is the video doorbell 210(*c*)), the motion sensors 326, a reset button (not shown in FIG. 3 for simplicity), and/or the non-volatile memory 324. The network interface 312 may also include the capability of communicating over wired connections, such as with a signaling device 308. For example, when the button 306 of the video doorbell 210(*c*) is pressed, the network interface 312 may be triggered to perform one or more functions, such as to transmit a signal over the wired 334(*b*) connection to the signaling device 308 (although, in some embodiments, the signal be transmitted over a wireless 334(*a*) connection to the signaling device) to cause the signaling device 308 to emit a sound (e.g., a doorbell tone, a user customized sound, a ringtone, a seasonal ringtone, etc.). The network interface 312 may also act as a conduit for data communicated between various components and the processor(s) 310.

With further reference to FIG. 3, the A/V device 210 may include the non-volatile memory 324 and the volatile memory 322. The non-volatile memory 324 may comprise flash memory configured to store and/or transmit data. For example, in certain embodiments the non-volatile memory 324 may comprise serial peripheral interface (SPI) flash memory. In some embodiments, the non-volatile memory 324 may comprise, for example, NAND or NOR flash memory. The volatile memory 322 may comprise, for example, DDR3 SDRAM (double data rate type three synchronous dynamic random-access memory). In the embodiment illustrated in FIG. 3, the volatile memory 322 and the non-volatile memory 324 are illustrated as being separate from the processor(s) 310. However, the illustration of FIG. 3 is not intended to be limiting, and in some embodiments the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3, the A/V device 210 may include the camera 314. The camera 314 may include an image sensor 336. The image sensor 336 may include a video recording sensor and/or a camera chip. In one aspect of the present disclosure, the imager sensor 336 may comprise a complementary metal-oxide semiconductor (CMOS) array and may be capable of recording high definition (e.g., 722p, 1080p, 4K, etc.) video files. The camera 314 may include a separate camera processor (not shown in FIG. 3 for simplicity), or the processor(s) 310 may perform the camera processing functionality. The processor(s) 310 (and/or camera processor) may include an encoding and compression chip. In some embodiments, the processor(s) 310 (and/or the camera processor) may comprise a bridge processor. The processor(s) 310 (and/or the camera processor) may process video recorded by the image sensor 336 and/or audio recorded by the microphone(s) 328, and may transform this data into a form suitable for transfer by the network interface 312 to the network (Internet/PSTN) 212. In various embodiments, the camera 314 also includes memory, such as volatile memory that may be used when data is being buffered or encoded by the processor(s) 310 (and/or the camera processor). For example, in certain embodiments the camera memory may comprise synchronous dynamic random-access memory (SD RAM).

The camera 314 may further include an IR cut filter 338 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 229 may shine infrared light through an enclosure of the A/V device 210 out to the environment, and the IR cut filter 338 may enable the image sensor 336 to see this infrared light as it is reflected or refracted off of objects within the field of view of the doorbell. This process may provide the A/V device with the "night vision" function mentioned above.

With further reference to FIG. 3, the A/V device 210 may comprise the light sensor 318 and the one or more light-emitting components 340, such as LED's. The light sensor 318 may be one or more sensors capable of detecting the level of ambient light of the surrounding environment in which the A/V device 210 may be located. The light-emitting components 340 may be one or more light-emitting diodes capable of producing visible light when supplied with power (e.g., to enable night vision). In some embodiments, when activated, the light-emitting components 340 illuminates a light pipe.

The A/V device 210 may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some embodiments, the A/V device 210 may include two or more microphone(s) 328 that are spaced from one another (e.g., located on different sides of the A/V device 210) to provide noise cancelling and/or echo cancelling for clearer audio. The speaker(s) 330 and/or microphone(s) 328 may be coupled to an audio CODEC 320 to enable digital audio received by client devices to be decompressed and output by the speaker(s) 330 and/or to enable audio data captured by the microphone(s) 328 to be compressed into digital audio data. The digital audio data may be received from and transmitted to client devices using the network interface 312 (in some embodiments, through one or more intermediary devices such as the hub device 202, the VA device 208, and/or one or more components of the network of servers/backend devices 220 as described in FIG. 2). For example, when a visitor (or intruder) who is present in the area about the A/V device 210 speaks, sound from the visitor (or intruder) is received by the microphone(s) 328 and compressed by the audio CODEC 320. Digital audio data is then sent through the network interface 312 to the network 212 via the user's network 218, routed by the backend server 224 and/or the backend API 226 and delivered to the client device(s) 214, 216 as described above in connection with FIG. 2. When the user speaks, after being transferred through the network 212, the user's network 218, and the network interface 312, the digital audio data from the user is decompressed by the audio CODEC 320 and emitted to the visitor through the speaker(s) 330.

With further reference to FIG. 3, the A/V device 210 may be battery powered using a battery 342 and/or may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, a battery 342 may not be included. In embodiments that include the battery 342, the A/V device 210 may include an integrated circuit (not shown) capable of arbitrating between multiple voltage rails, thereby selecting the source of power for the A/V device 210. The A/V device 210 may have separate power rails dedicated to the battery 342 and the AC power source. In one aspect of the present disclosure, the A/V device 210 may continuously draw power from the battery 342 to power the A/V device 210, while at the same time routing the AC power to the battery, thereby allowing the battery 342 to maintain a substantially constant level of charge. Alternatively, the A/V device 210 may continuously draw power from the AC power to power the doorbell, while only drawing from the battery 342 when the AC power is low or insufficient. Still, in some embodiments, the battery 342 comprises the sole source of power for the A/V device 210. In such embodiments, the components of the A/V device 210 (e.g., spring contacts, connectors, etc.) are not be connected to a source of AC power. When the battery 342 is depleted of its charge, it may be recharged, such as by connecting a power source to the battery 342 (e.g., using a USB connector).

Although not illustrated in FIG. 3, in some embodiments, the A/V device 210 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 210 so as to reduce interference from heat, pressure, moisture, and/or other stimuli generated by the internal components of the A/V device 210.

With further reference to FIG. 3, the A/V device 210 may include one or more motion sensor(s) 326. However, in some embodiments, the motion sensor(s) 326 may not be included, such as where motion detection is performed by the camera 314 or another device. The motion sensor(s) 326 may be any type of sensor capable of detecting and communicating the presence of an entity within their field of view. As such, the motion sensor(s) 326 may include one or more (alone or in combination) different types of motion sensors. For example, in some embodiments, the motion sensor(s) 326 may comprise passive infrared (PIR) sensors, which may be secured on or within a PIR sensor holder that may reside behind a lens (e.g., a Fresnel lens). In such an example, the PIR sensors may detect IR radiation in their field of view and produce an output signal (typically a voltage) that changes as the amount of IR radiation in the field of view changes. The amount of voltage in the output signal may be compared, by the processor(s) 310, for example, to one or more threshold voltage values to determine if the amount of voltage in the output signal is indicative of motion, and/or if the amount of voltage in the output signal is indicative of motion of an entity that is to be captured by the camera 314 (e.g., motion of a person and/or animal may prompt activation of the camera 314, while motion of a vehicle may not). Although the above discussion of the motion sensor(s) 326 primarily relates to PIR sensors, depending on the embodiment, the motion sensor(s) 326 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include Doppler shift data from an ultrasonic-type motion sensor, the output signal may include radio wave disturbance from a tomographic-type motion sensor, and/or the output signal may include other data types for other sensor types that may be used as the motion sensor(s) 326 of the A/V device 210.

In some embodiments, computer vision component(s) (CVM) 316 may be included in the A/V device 210 as the motion sensor(s) 326, in addition to, or alternatively from, other motion sensor(s) 326. For example, the CVM 316 may be a low-power CVM (e.g., Qualcomm Glance) that, by operating at low power (e.g., less than 2 mW of end-to-end power), is capable of providing computer vision capabilities and functionality for battery powered devices (e.g., the A/V device 210 when powered by the battery 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral bus interface (SPI)). As such, the low-power CVM may be considered to be one or more of the motion sensor(s) 326, and the data type output in the output signal may be the post-processed computer vision metadata. The metadata may include information such as the presence of a particular type of entity (e.g., person, animal, vehicle, parcel, etc.), a direction of movement of the entity, a distance of the entity from the A/V device 210, etc. In various embodiments, the motion sensor(s) 326 include a plurality of different sensor types capable of detecting motion such as PIR, AIR, low-power CVM, and or cameras.

As indicated above, the A/V device 210 may include the CVM 316 (which may be the same as the above described low-power CVM 316 implemented as one or more motion sensor(s) 326, or may be additional to, or alternative from, the above described low-power CVM 316). For example, the A/V device 210, the hub device 202, the VA device 208, and/or one or more component of the network(s) of servers/backend devices 220 may perform any or all of the computer vision processes and functionalities described herein. In addition, although the CVM 316 is only illustrated as a component of the A/V device 210, the computer vision component 316 may additionally, or alternatively, be included as a component of the hub device 202, the VA device 208, and/or one or more components of the network of servers/backend devices 220. With respect to the A/V device 210, the CVM 316 may include any of the components (e.g., hardware) and/or functionality described herein with respect to computer vision, including, without limitation, one or more cameras, sensors, and/or processors. In some of the present embodiments, with reference to FIG. 3, the microphone(s) 328, the camera 314, the processor(s) 310, and/or the image sensor 336 may be components of the CVM 316. In some embodiments, the CVM 316 may include an internal camera, image sensor, and/or processor, and the CVM 316 may output data to the processor(s) 310 in an output signal, for example.

As a result of including the CVM 316, some of the present embodiments may leverage the CVM 316 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)— Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)— Differentiating human beings (e.g., head and shoulder patterns) from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to, re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object. Decision making—Making the final decision required for the application, for example match/no-match in recognition applications.

One or more of the present embodiments may include a vision processing unit (not shown separately, but may be a component of the CVM 316). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some facial recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIG. 3, the CVM 316, and/or the camera 314 and/or the processor(s) 310 may receive information about the person using any one, or any combination of more than one, of the foregoing biometrics.

Again, with reference to FIG. 3, in embodiments where the A/V device 210 includes a light camera, the A/V device 210 may include the light controller 302 and one or more lights 304(a), 304(b) (collectively referred to herein as "lights 304"). The light controller 302 may include a switch for controlling the lights 304. For example, in response to the motions sensor(s) 326 and/or the camera 314 detecting motion, the light controller 236 may receive an output signal from the processor(s) 310 that causes the light controller 302 to activate the one or more lights 304(a), 304(b). In some embodiments, the light camera may include motion sensor(s) 326 detecting motion for controlling activation of the lights 304, and may further include the camera 314 for detecting motion for activating the recording of the image data using the camera 314 and/or the recording of the audio data using the microphone(s) 328. In other embodiments, the motion sensor(s) 326 may detect the motion for activating the lights 304, the camera 314, and the microphone(s) 328, or the camera 314 may detect the motion for activating the lights 304, the camera 314 to being recording the image data, and the microphone(s) 328 to being recording the audio data. The lights 304 may include floodlights, spotlights, porch lights, or another type of illumination device. The lights 304 may provide for better image data quality when ambient light levels are low (e.g., at dusk, dawn, or night), while also providing a deterrent effect by being illuminated when motion is detected.

With further reference to FIG. 3, in embodiments where the A/V device 210 includes a doorbell, such as the video doorbell 210(c), the A/V device 210 may include the button 306. In embodiments where the button 306 is a mechanical button (e.g., has a range of movement), the button 306 may make contact with a button actuator located within the video doorbell 210(c) when the button 306 is pressed. In embodiments where the button 306 is not mechanical (e.g., has no range of motion), the button 306 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 306 is pressed, touched, and/or otherwise triggered, the processor(s) 310 may receive an output signal from the button 306 that may activate one or more functions of the video doorbell 210(c), such as transmitting an output signal, using the network interface 312, to the signaling device 308 to cause the signaling device 308 to output a sound (e.g., via the wired 334(b) connection to the signaling device 308 and/or a wireless 334(a) connection to the signaling device 308). In addition, the processor(s) 310 may transmit an output signal (e.g., a message), using the network interface 312, to the client device(s) 214, 216 to indicate to the user(s) of the client device(s) 214, 216 that a person is present at the A/V device 210 (in some embodiments, via at least one of the hub device 202, the VA device 208, and/or one or more component of the network of servers/backend devices 220).

Although the A/V recording and communication device 210 (or A/V device 210) is referred to herein as an "audio/video" device, the A/V device 210 need not have both audio and video functionality. For example, in some embodiments, the A/V device 210 may not include the speakers 330, microphones 328, and/or audio CODEC. In such examples, the A/V device 210 may only have video recording and communication functionalities. In other examples, the A/V device 210 may only have the speaker(s) 330 and not the microphone(s) 328, or may only have the microphone(s) 328 and not the speaker(s) 330.

Figure 4:
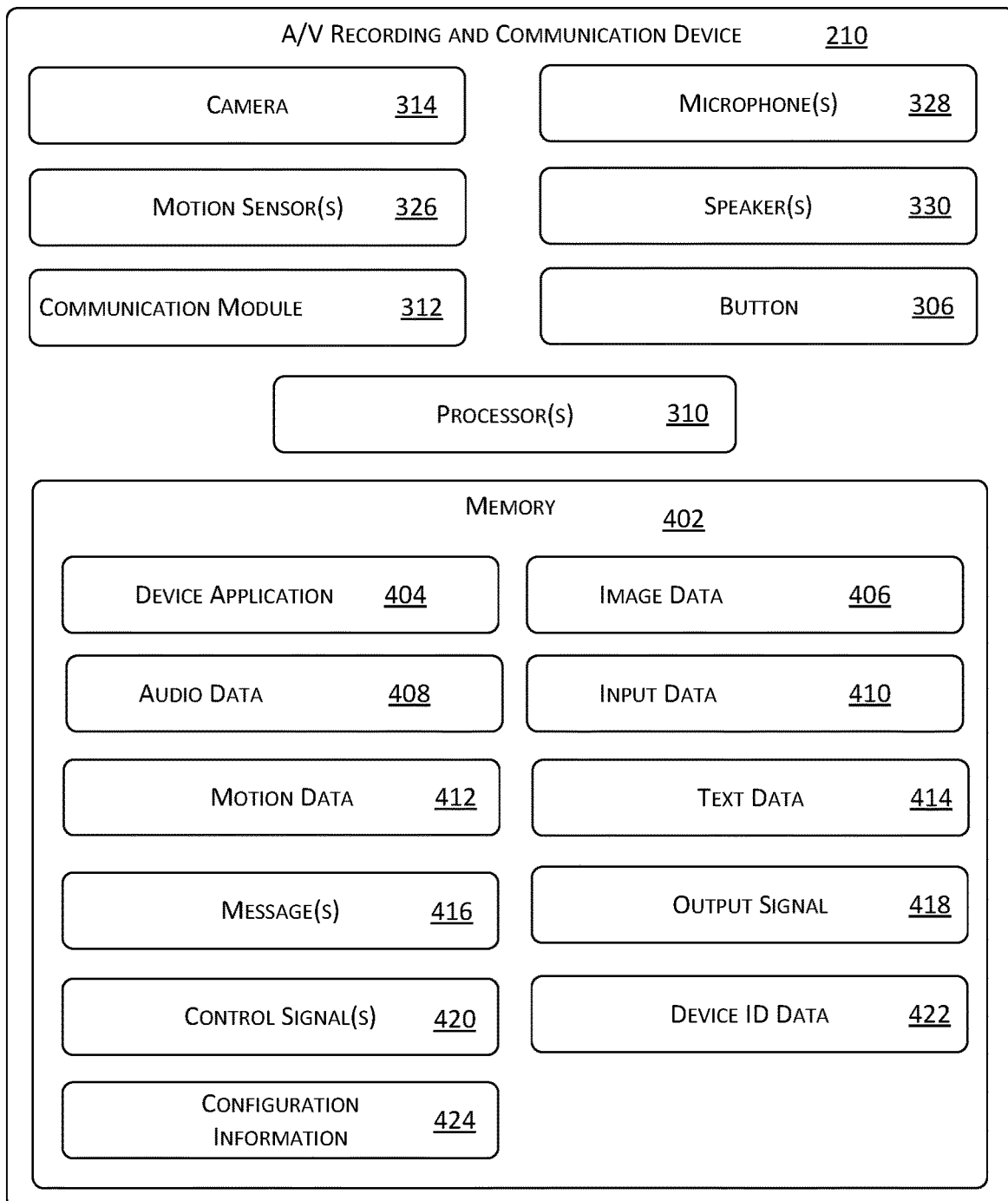
FIG. 4 is a functional block diagram illustrating one example embodiment of an A/V recording and communication device according to various aspects of the present disclosure.

FIG. 4 is another functional block diagram illustrating an embodiment of an A/V device 210 according to various aspects of the present disclosure. In some embodiments, the A/V device 210 may represent, and further include one or more of the components from, the A/V doorbell 210(c), the A/V security camera 210(a), and/or the floodlight controller 210(b). Additionally, in some embodiments, the A/V device 210 may omit one or more of the components shown in FIG. 4 and/or may include one or more additional components not shown in FIG. 4.

As shown in FIG. 4, the A/V device 210 includes memory 402, which may represent the volatile memory 322 and/or the non-volatile memory 324. The memory 402 stores a device application 404. In various embodiments, the device application 404 may include instructions that, when executed by the processor(s) 310, cause the processor(s) 310 to capture image data 406 using the camera 314, audio data 408 using the microphone(s) 328, input data 410 using the button 306 (and/or the camera 314 and/or the motion sensor(s) 326, depending on the embodiment), and/or motion data 412 using the camera 314 and/or the motion sensor(s) 326. In some embodiments, the device application 404 may also include instructions that, when executed by the processor(s) 310, cause the processor(s) 310 to generate text data 414 describing the image data 406, the audio data 408, and/or the input data 410, such as in the form of metadata, for example.

In addition, the device application 404 may include instructions that, when executed by the processor(s) 310, cause the processor(s) 310 to transmit the image data 406, the audio data 408, the motion data 412, the input data 410, the text data 414, and/or message(s) to the client devices 214, 216, the hub device 202, and/or the backend server 224 using the network interface 312. In various embodiments, the device application 404 may also include instructions that, when executed by the processor(s) 310, cause the processor(s) 310 to generate and transmit an output signal 418 that may include the image data 406, the audio data 408, the text data 414, the input data 410, and/or the motion data 412. In some of the present embodiments, the output signal 418 may be transmitted to the backend server 224 and/or the hub device 202 using the network interface 312, and the backend server 224 and/or the hub device 202 may transmit (or forward) the output signal 418 to the client device 214, 216 and/or the backend server 224 may transmit the output signal 418 to the hub device 202. In other embodiments, the output signal 418 may be transmitted directly to the client device 214, 216 and/or the hub device 202.

In further reference to FIG. 4, the image data 406 may comprise image sensor data such as (but not limited to) exposure values and data regarding pixel values for a particular sized grid. The image data 406 may include still images, live video, and/or pre-recorded images and/or video. The image data 406 may be recorded by the camera 314 in a field of view of the camera 314.

In further reference to FIG. 4, the motion data 412 may comprise motion sensor data generated in response to motion events. For example, the motion data 412 may include an amount or level of a data type generated by the motion sensor(s) 326 (e.g., the voltage level output by the motion sensor(s) 326 when the motion sensor(s) 326 are PIR type motion sensor(s)). In some of the present embodiments, such as those where the A/V device 210 does not include the motion sensor(s) 326, the motion data 412 may be generated by the camera 314. In such embodiments, based on a frame by frame comparison of changes in the pixels from the image data 406, it may be determined that motion is present.

The input data 410 may include data generated in response to an input to the button 306. The button 306 may receive an input (e.g., a press, a touch, a series of touches and/or presses, etc.) and may generate the input data 410 in response that is indicative of the type of input. In embodiments where the A/V device 210 is not a doorbell (e.g., the video doorbell 210(c)), the A/V device 210 may not include the button 306, and the A/V device 210 may not generate the input data 410.

With further reference to FIG. 4, a message 416 may be generated by the processor(s) 310 and transmitted, using the network interface 312, to the client device 214, 216, the backend server 224, and/or the hub device 202. For example, in response to detecting motion using the camera 314 and/or the motion sensor(s) 326, the A/V device 210 may generate and transmit the message 416. In some of the present embodiments, the message 416 may include at least the image data 406, the audio data 408, the text data 414, and/or the motion data 412.

As described herein, the message(s) 416 may include messages, signals, data, notifications, and/or any type of electronic communication that electronic devices (e.g., the A/V device 210, the client device 214, 216, the hub device 202, one or more components of the network(s) of servers/backend devices 220, the electronic device 230, and/or the light emitters 232) may transmit and receive with other electronic devices (e.g., the A/V device 210, the client device 214, 216, the hub device 202, one or more components of the network(s) of servers/backend devices 220, the electronic device, and/or the light emitters). For instance, message(s) 416 may include push notifications, email messages, short message service (SMS) messages, multimedia messages (MMS), voicemail messages, video signals, audio signals, data transmissions, and/or any other type of electronic communication that an electronic device can transmit to another electronic device.

As described herein, control signal(s) 420 may include messages, signals, data, notifications, and/or any type of electronic communication that electronic devices (e.g., the A/V device 210, the client device 214, 216, the hub device 202, one or more components of the network(s) of servers/backend devices 220, the electronic device 230, and/or the light emitters) may transmit and receive with other electronic devices (e.g., the A/V device 210, the client device 214, 216, the hub device 202, one or more components of the network(s) of servers/backend devices 220, the electronic device 230, and/or the light emitters). For instance, control signal(s) 420 may include push notifications, email messages, short message service (SMS) messages, multimedia messages (MMS), voicemail messages, audio signals, data transmissions, and/or any other type of electronic communication that an electronic device can transmit to another electronic device.

The image data 406, the audio data 408, the text data 414, and/or the motion data 412 may be tagged with (e.g., a time stamp, based on clock data) and/or stored separately (e.g., on the backend server 224, the hub device 202, and/or the A/V device 210) based on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with image data 406, audio data 408, text data 414, and/or motion data 412 representative of the detection of motion, or motion event. As a result, when a request for data pertaining to particular motion event, or a particular time period, is received (e.g., by the client device 214, 216, the backend server 224, and/or the hub device 202), the image data 406, the audio data 408, the text data 414, and/or the motion data 412 associated with a particular motion event, and/or associated with motion event(s) within the particular time period, may be transmitted, retrieved, and/or received.

Although examples discuss the A/V device 210 generating and transmitting the image data 406, the audio data 408, the text data 414, and/or the motion data 412 when motion is detected (e.g., in the message 416), in other examples the data may be generated and/or transmitted at other times. For example, the image data 406, the audio data 408, the text data 414, and/or the motion data 412 may be generated and transmitted continuously (e.g., in a streaming manner), periodically, upon request, etc. In examples where the image data 406, the audio data 408, the text data 414, and/or the motion data 412 may be generated and transmitted continuously, the detection of motion (e.g., a motion event) may cause an indication of when the motion was detected (e.g., a time stamp) and/or how long the motion was detected for (e.g., a duration) to be associated with the image data 406, the audio data 408, the text data 414, and/or the motion data 412. As a result, even though the image data 406, the audio data 408, the text data 414, and/or the motion data 412 may be continuously generated by the A/V device 210, the image data 406, the audio data 408, the text data 414, and/or the motion data 412 associated with motion events may be tagged and/or stored separately (e.g., similar to that of the image data 406, the audio data 408, the text data 414, and/or the motion data 412 generated in response to the detection of motion), from the image data 406, the audio data 408, the text data 414, and/or the motion data 412 that is not associated with motion events.

As also illustrated in FIG. 4, the A/V device 210 may also include device ID data 422. For example, the device ID data 422 may include information about a type of the device, a serial number associated with the device, a make and/or model of the device, and/or other identifying information about the device. The device ID data 422 may also include a certificate and/or key information used to authenticate the device after installation, e.g., with the manufacturer, with an application running on a client device, and/or with another device, such as the hub device 202.

The A/V device 210 may also store configuration information 424. For example, the configuration information 424 may include settings associated with the A/V device 210. Such settings may include, but are not limited to, communication settings, e.g., configuration information for one or more networks over which the A/V device 210 can communicate, a service set identifier (SSID) associated with the one or more networks, a password associated with the one or more networks, functionality settings, e.g., a duration for which the camera of the A/V device 210 will record and/or events that will cause the camera to record, and/or the like. In embodiments described herein, associating devices with the A/V device 210 and/or associating the A/V device 210 with another device may alter the configuration information 424.

Figure 5:
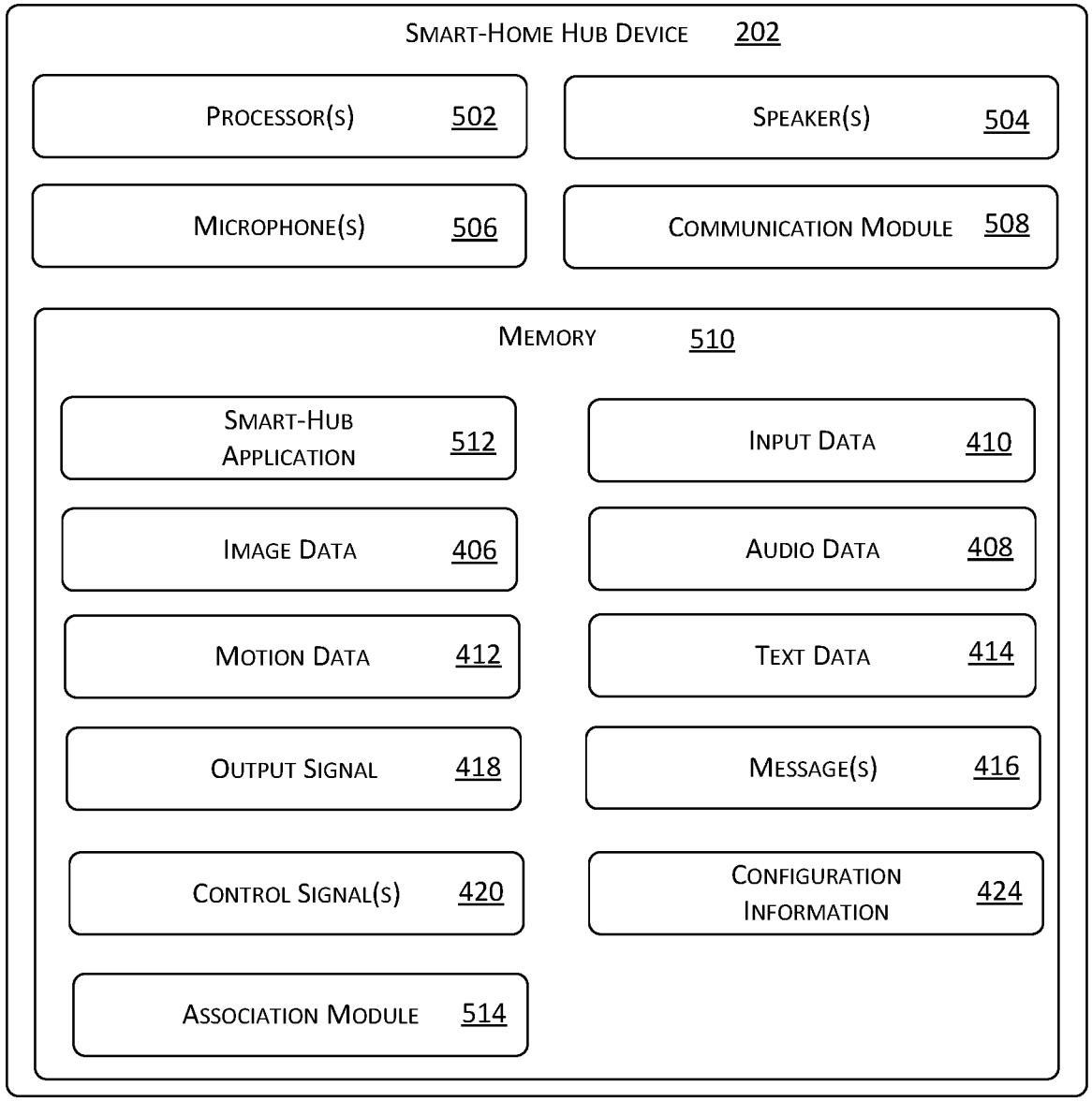
FIG. 5 is a functional block diagram illustrating one example embodiment of a smart-home hub device according to various aspects of the present disclosure.

FIG. 5 is a functional block diagram illustrating an embodiment of the smart-home hub device 202 (alternatively referred to herein as the "hub device 202") according to various aspects of the present disclosure. The hub device 202 may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 212 for enabling remote control of the hub device 202), and/or another similar device. In some examples, the hub device 202 may include the functionality of the VA device 208. The hub device 202 may comprise processor(s) 502 (which may be similar to, and/or include similar functionality as, the processor(s) 310) that are operatively connected to speaker(s) 504, microphone(s) 506, a network interface 508 (which may be similar to, and/or include similar functionality as, the network interface 310), and memory 510 (which may be similar to, and/or include similar functionality as, the memory 402). In some embodiments, the hub device 202 may further comprise one or more of a camera (not shown). In some embodiments, the hub device 202 may not include one or more of the components shown in FIG. 5, such as the speaker(s) 504 and/or the microphone(s) 506.

As shown in the example of FIG. 5, the memory 510 stores a smart-home hub application 512. In various embodiments, the smart-home hub application 512 may include instructions that, when executed by the processor(s) 502, cause the processor(s) 502 to receive sensor data from the A/V devices 210, the sensors 204, and/or the automation devices 206. For example, the sensor data, with respect to the sensors 204 and/or the automation devices 206, may include a current state (e.g., opened/closed for door and window sensors, motion detected for motion sensors, living room lights on/off for a lighting automation system, etc.) of each of the sensors 204 and/or the automation devices 206. In some of the present embodiments, the sensor data may be received in response to sensor triggers. The sensor triggers may be a door opening/closing, a window opening/closing, lights being turned on/off, blinds being opened/closed, etc. As such, the sensor data may include the current state of the sensors 204 and/or the automation devices 206 as well as any updates to the current state based on sensor triggers.

With further reference to FIG. 5, the smart-home hub application 512 may include instructions that, when executed by the processor(s) 502, cause the processor(s) 502 to receive the sensor data (e.g., the audio data 408, the image data 406, the motion data 412, the input data 410, etc.) and/or the text data 414, the messages 416, and/or the control signal(s) 420, from the A/V device 210 (in some embodiments, via the backend server 224) using the network interface 508. For example, the hub device 202 may receive and/or retrieve (e.g., after receiving a signal from the A/V device 210 that the A/V device 210 has been activated and/or detected motion) the image data 406, the input data 410, the motion data 412, and/or the control signal(s) 420 from the A/V device 210 and/or the backend server 224 in response to motion being detected by the A/V device 210. In some embodiments, as described herein, the image data 406, the audio data 408, and/or the motion data 412 may be continuously, or otherwise, received, and in response to motion being detected, the message 416, the text data 414, and/or the control signal(s) 420 may be received. The smart-hub application 512 may include instructions that, when executed by the processor(s) 502, cause the processor(s) 502 to transmit, using the network interface 508, the audio data 408, the text data 414, the image data 406, the motion data 412, the input data 410, the messages 416, and/or the control signal(s) 420 to the client device 214, 216, the backend server 224, and/or an additional electronic device (e.g., a second A/V device 230, the automation device(s) 206, the sensor(s) 204, etc.).

As also illustrated in FIG. 5, the smart-home hub device 202 may also store the configuration information 424 and an association component 514. For example, the association component 514 may include instructions that can be executed by the processor 502 to perform functionality to associate devices, as described herein. In some example embodiments, the smart-home hub device 202 may execute the association component 514 to facilitate provisioning of a newly-installed A/V device 210. For example, the association component 514 may request the device ID data 422 from a newly-installed device 210, and communicate, e.g., via the network interface 508, with a remote server and/or the device 210 to authenticate the device 210 and establish communication with the device 210.

As described herein, at least some of the processes of the A/V device 210, the backend server 224, and/or the client device 214, 216 may be executed by the hub device 202. For example, the hub device 202 may determine devices installed in the geographic area, generate and transmit at least a portion of a visual representation of the geographic area including representations of installed device(s), etc. Moreover, the hub device 202 may include a display that can be configured to render the GUIs described herein.

Figure 6:
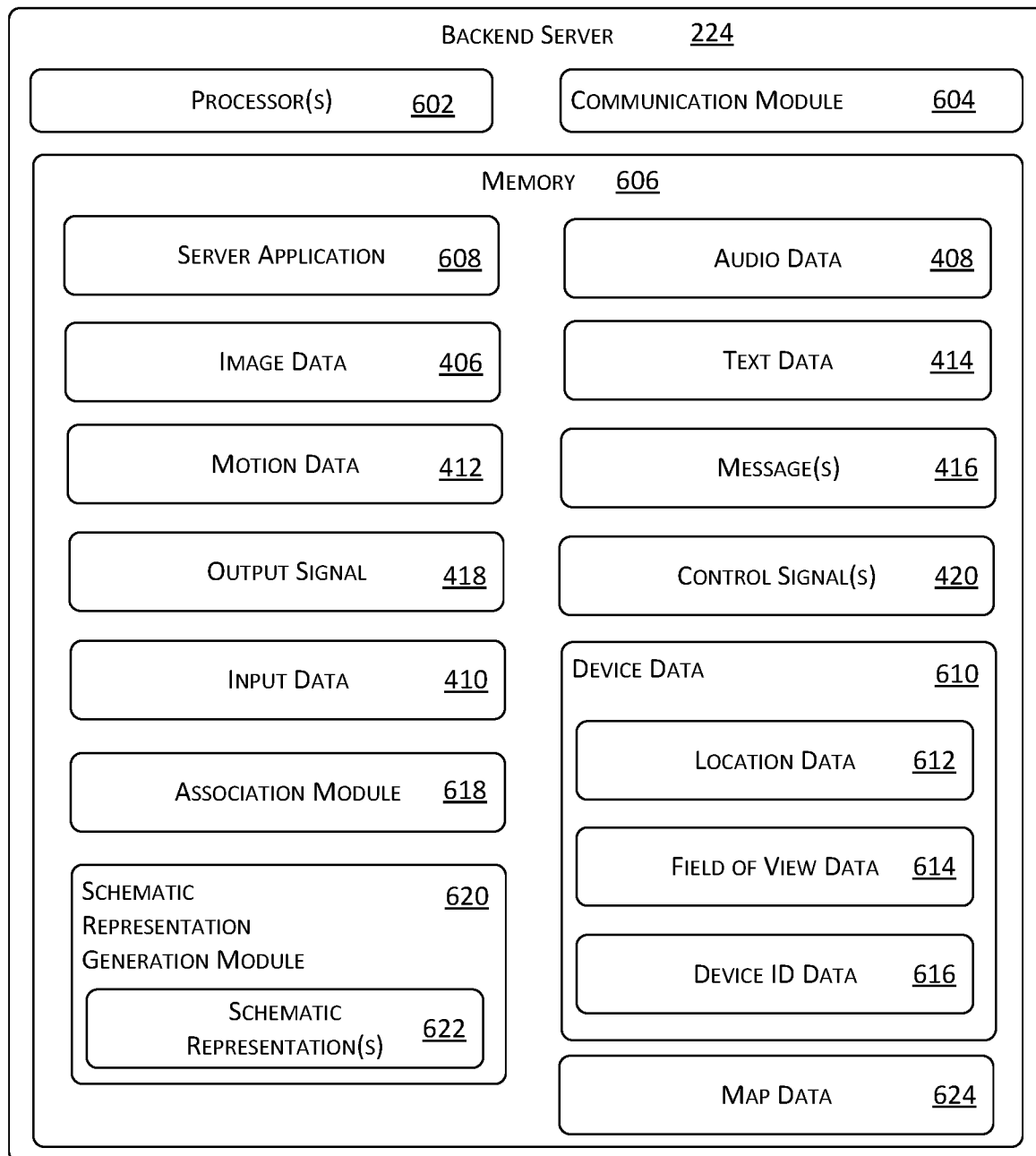
FIG. 6 is a functional block diagram illustrating one example embodiment of a backend device according to various aspects of the present disclosure.

FIG. 6 is a functional block diagram illustrating one embodiment of the backend server 224 according to various aspects of the present disclosure. The backend server 224 may comprise processor(s) 602 (which may be similar to, and/or include similar functionality as, the processor(s) 310), a network interface 604 (which may be similar to, and/or include similar functionality as, the network interface 312), and a memory 606 (which may be similar to, and/or include similar functionality as, the memory 402). The network interface 604 may allow the backend server 224 to access and communicate with devices connected to the network (Internet/PSTN) 212 (e.g., the A/V device 210, the hub device 202, the VA device 208, the client devices 214, 216, a device controlled by the security monitoring service 228, etc.).

The memory 606 may include a server application 608 that includes instructions that, when executed by the processor(s) 602, cause the processor(s) 602 to receive and/or retrieve the audio data 408, the text data 414, the input data 410, the messages 416, the image data 406, the motion data 412, and/or the control signal(s) 420 from the A/V device 210 (e.g., in the output signal 418) and/or the hub device 202. The server application 608 may also include instructions that, when executed by the processor(s) 602, cause the processor(s) 602 to transmit (and/or forward) the audio data 408, the text data 414, the input data 410, the messages 416, the image data 406, and/or the motion data 412 to the client devices 214, 216 using the network interface 604. Furthermore, the server application 608 may include instructions that, when executed by the processor(s) 602, cause the processor(s) 602 to transmit, using the network interface 604, the control signal(s) 420 to one or more electronic devices (e.g., the A/V device 210, a second A/V device 230, the automation devices 206, the sensors 204, etc.).

Although referred to as the backend server 224 with reference to the processes described herein, the backend server 224 may additionally, or alternatively, include one or more of the devices from the network(s) of servers/backend devices 220. For example, the processes described herein with respect to the backend server 224 may additionally, or alternatively, at least in part, be performed by one or more backend APIs 226. Moreover, in some examples, functionality described herein as performed by the backend server 224 may be performed by the hub device 202.

In further reference to FIG. 6, the memory 606 may also include device data 610 that may be used, for example, to identify the A/V device 210, the hub device 202, the VA device 208, the automation device(s) 206, the sensor(s) 204, the client devices 214, 216, the electronic device 230, and/or the light emitters 232. In some embodiments, the device data 610 may be used by the processor(s) 602 of the backend server 224 to determine the client devices 214, 216 that are associated with the A/V device 210, the automation devices 206, the sensors 204, the hub device 202, the electronic device 230, and/or the light emitters 232. While the device data 610 may pertain to devices associated with a single smart-home hub device 202, in some embodiments a broader network of devices, such as devices networked via a geographic area (e.g., a city block, neighborhood, city, state, the geographic area 102, etc.), group, or other criteria, may be used.

In some embodiments, the device data 610 may include location data 612, field of view data 614, and/or device identification data 616. The location data 612 may include information about locations of the A/V device 210, the hub device 202, the VA device 208, the automation device(s) 206, the sensor(s) 204, the client devices 214, 216, the electronic device 230, and/or the light emitters 232. For instance, the location data 612 may include coordinates (e.g., GNSS (e.g., GPS) coordinates, Cartesian coordinates, or the like), addresses, location-defined names (e.g., "front door doorbell," "back yard floodlight cam," etc.), estimated physical locations (determined using a received signal strength indicator (RSSI), determined using the image data generated by another A/V device and/or the client device 214, 216, etc.), and/or other location information of the associated devices. Moreover, the location data 612 may include an association of the respective device with a feature of the property. For example, an A/V device 210 may be associated with a specific door or window, and that association may be stored as part of the location data 612.

The field of view data 614 may include information about a size and/or extent of a field of view associated with each of the A/V devices 210. In some instances, the field of view data 614 may include multiple fields of view associated with each A/V device 210. For instance, a first field of view may be associated with the camera's 314 field of view, a second field of view may be associated with the motion sensor's 326 field of view, and additional fields of view may be associated with still further sensor types (e.g., temperature sensors, moisture sensors, etc.). The field of view data 614 may include coordinates and/or directions associated with the extents of the respective fields of view (e.g., relative to the location data 612). For example, the field of view of the camera 314 may be defined by a plurality of coordinates that make up the field of view of the camera 314. In some embodiments, the coordinates of the field of view of the camera 314 may include a smaller field of view than the actual field of view of the camera 314. For example, the field of view of the camera 314 may include the lawn, the sidewalk, and/or the street in front of the property, but the coordinates may only include the portions of the field of view that are part of the property (e.g., the lawn and the sidewalk). As another example, the actual field of view of the A/V device 210 may extend across a street, into a neighboring property, but the field of view for purposes of the field of view data may be a default, standard, and/or assigned field of view based on the model (e.g., based on the device identification data 313, described herein), camera type, motion sensor type, user settings, configuration settings, and/or other criteria of the A/V device 210, such that the field of view data only includes coordinates (or other location measurements) that extend to the street. Accordingly, even though Device Model X may have a camera field of view of 140 degrees (as measured in a horizontal plane) with a radius of 300 feet, the default camera field of view included in the field of view data may be a camera field of view of 140 degrees with a radius of 150 feet. As such, only the portion of the field of view of the camera 314 (or similarly, the field of view of the motion sensor 326) defined by the coordinates (or other location measurements) may be used in motion detection, computer vision processing, image processing, entity tracking at the property, and/or for purposes of displaying the field(s) of view on a map.

The device identification data 616 may include additional information about specific A/V devices 210, sensors 204, automation devices 206, electronic devices 230, and/or light emitters 232. For example, the device data 610 may include the device ID data 422, and may include a type, a model, and/or the like associated with the respective devices. In some embodiments, the device identification data 616 may be used to determine the extent of a field of view associated with a specific A/V device 210. For example, the camera 314 of the A/V doorbell 210(a) may have a field of view that extends a distance of 100 feet from the doorbell 210(a), while the camera 314 of the light camera 210(b) may have a field of view that extends a distance of 300 feet from the light camera 210(b). As such, the device identification data 616, including the size of the field of view, may be used to determine the coordinates for the field of view of the camera 314 and/or the field of view of the motion sensor 326.

As further illustrated in FIG. 6, the memory 606 may store an association component 620, which may be similar to, or the same as, the association component 514, for example. The association component 620 may configure the processor(s) 602 of the backend server 224 to facilitate functionality for associating devices according to embodiments described herein. For example, the association component 620 may configure the processor(s) 602 to generate output signals 418 and/or control signal(s) 420 to cause presentation of GUIs, e.g., the GUIs 100(a), 100(b), to adjust configuration information 424 for specific devices 210, and the like.

In some examples of this disclosure, the memory 606 may also store a visual representation generation component 620, which may configure the processor(s) 602 of the backend server 224 to generate a visual representation 622 of all or part of a geographic area, such as the geographic area 102. More specifically, in some embodiments the visual representation generation component 620 may configure the processor(s) 602 to determine a location of one or more objects in an environment, and generate the visual representation 622 based on those objects and their locations. In some embodiments, the representation of the property may be based on or augmented using map data 624, which may be received from a third-party map provider, for example, such as Google Maps, Apple Maps, Google Earth, and/or the like. In some examples, the map data 624 may include any details about a geographic area or portions of that geographic area. In some examples, the map data 624 may include an identification of metes and bounds of properties in a geographic area, an identification of features of the property, e.g., buildings, trees, utility poles, roads and the like, and/or an identification of features of structures in the geographic area, e.g., footprints or layouts. In some examples, the map data 624 may include local, city, state, and/or other government-based papers, permits, building data, and/or the like. The map data 624 may generally include any information that may be used to generate a visual representation of the property, for example.

The processor(s) 602 of the backend server 224 may also execute the visual representation generation component 620 to determine locations of devices, such as the A/V device(s) 210, sensors 204, automation devices 206, electronic device(s) 230, and/or light emitter(s) 232 on different properties. For example, the processor(s) 602 of the backend server 224 may receive device data 610 associated with a plurality of A/V devices 210, sensors 204, automation devices 206, electronic device(s) 230, and/or light emitter(s), to generate additional attributes of the visual representation 622. By way of example, and as will be described further with reference to FIG. 8, the processor(s) 602 of the backend server 224 may execute the visual representation generation component 620 to determine attributes for each installed device, e.g., a direction and/or extent of a field of view (for example, using the field of view data 614) in the geographic area 102, and to illustrate such attributes on the visual representation 622.

Upon generating the visual representation(s) 622, the processors 602 may be configured to generate and transmit, using the network interface 604 and to the client devices 214, 216, the visual representation(s) 622 generated by the visual representation generation component 620. The client devices 214, 216 may then render the visual representation(s) 622, e.g., as a map of the geographic area 102. As described further herein, the visual representation(s) 622 may be displayed as interactive maps of the geographic area. For example, the visual representation(s) 622 may be displayed to include interface elements associated with one or more of the A/V devices 210, with selection of the interface elements allowing a user to view, listen to, or otherwise consume sensor data associated with the respective A/V device 210.

In some embodiments, the server application 608 may further configure the processor(s) 602 to generate and transmit a report signal (not shown) to a third-party client device (not shown), which may be associated with a law enforcement agency or the security monitoring service 228, for example. The report signal, which may be the message 416 in some examples, may include the image data 406, the audio data 408, the text data 414, and/or other data.

As described herein, at least some of the processes of the backend server 224 may be executed by the A/V device 210, 230, the hub device 202, the VA device 208, and/or the client device 214, 216. In addition, the hub device 202 and/or the backend server 224 (and/or one or more additional or alternative components of the network(s) of servers/backend devices 220) may alternatively be referred to herein as a "network device" and/or "network devices."

Figure 7:
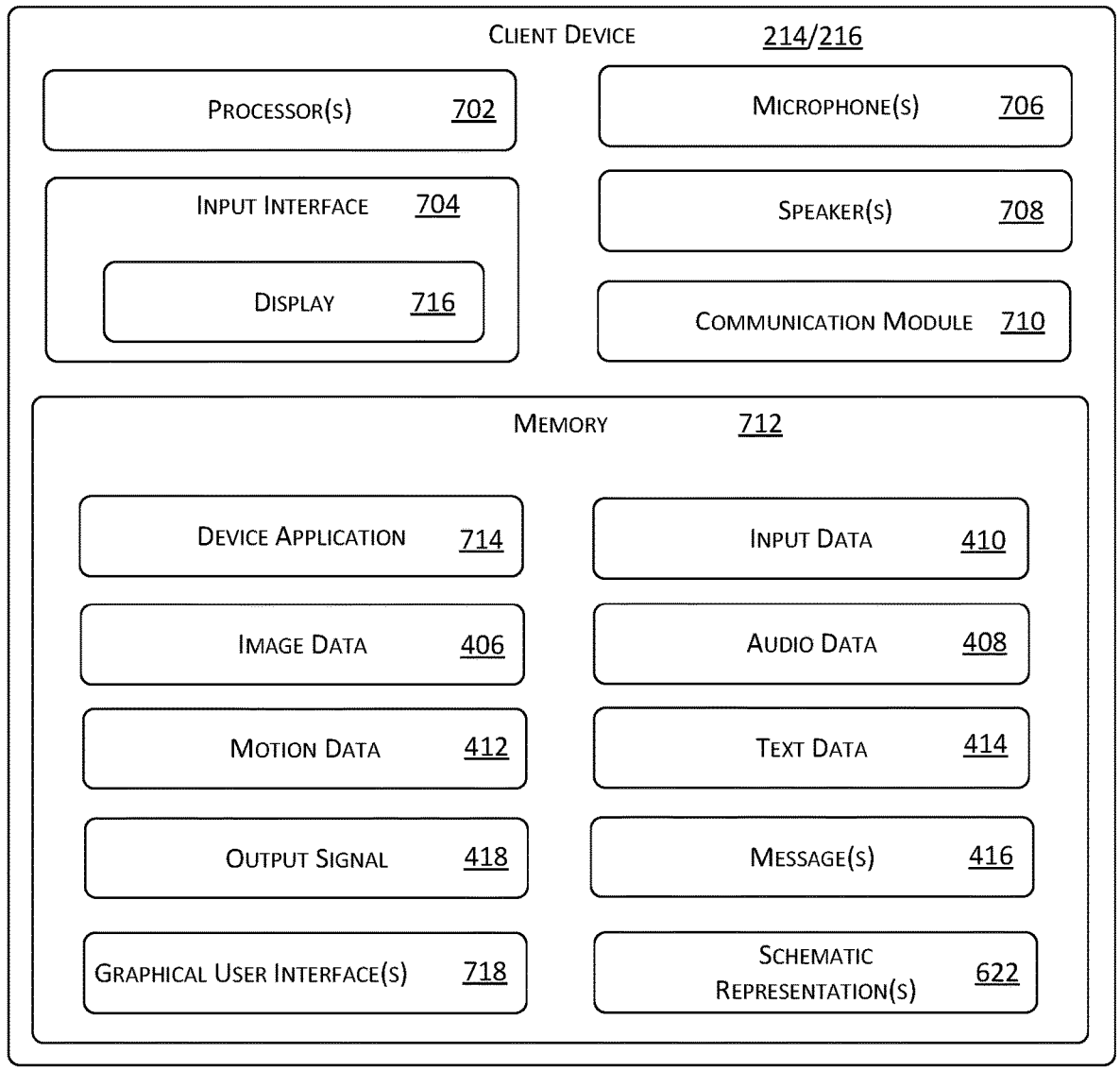
FIG. 7 is a functional block diagram illustrating one example embodiment of a client device according to various aspects of the present disclosure.

Now referring to FIG. 7, FIG. 7 is a functional block diagram illustrating one embodiment of the client device 214, 216 (which may be the client device 104), according to various aspects of the present disclosure. The client device 214, 216 may comprise processor(s) 702 (which may be similar to, and/or include similar functionality as, the processor(s) 310) that are operatively connected to an input interface 704, microphone(s) 706, speaker(s) 708, a network interface 710 (which may be similar to, and/or include similar functionality as, the network interface 312), and memory 712 (which may be similar to, and/or include similar functionality as, the memory 402). The client device 214, 216 may further comprise a camera (not shown) operatively connected to the processor(s) 702.

The memory 712 may store a device application 714. In various embodiments, the device application 714 may include instructions that, when executed by the processor(s) 702, cause the processor(s) 702 to receive input(s) to the input interface 704 (e.g., requests to access the image data 406, live view requests, requests for changing settings of one or more components of the home security/automation system, etc.). In addition, the device application 714 may include instructions that, when executed by the processor(s) 702, cause the processor(s) 702 to receive, using the network interface 710, the input data 410, the image data 406, the audio data 408, the output signal 418, and/or the messages 416 from one or more of the A/V device 210, the hub device 202, the VA device 208, or the backend server 224.

With further reference to FIG. 7, the input interface 704 may include a display 716. The display 716 may include a touchscreen, such that the user of the client device 214, 216 may provide inputs directly to the display 716 (e.g., requests to generate motion zone(s) 428, request(s) to generate association(s) 430, request(s) to generate condition(s) 436, etc.). In some embodiments, the client device 214, 216 may not include a touchscreen. In such embodiments, and in embodiments where the client device 214, 216 includes the touchscreen, the user may provide an input using any input device, such as, without limitation, a mouse, a trackball, a touchpad, a joystick, a pointing stick, a stylus, etc.

In some of the present embodiments, in response to receiving a message 416, the device application 714 may include instructions that, when executed by the processor(s) 702, cause the processor(s) 702 to cause the display 716 to display the message 416. The message 416 may indicate that the A/V device 210 detected motion and/or received an input to the button 306. While displaying the message 416, the input interface 704 may receive input from the user to answer the message 416. In response, the device application 714 may include instructions that, when executed by the processor(s) 702, cause the processor(s) 702 to display image(s) and/or a video feed represented by the received image data 406 on the display 716.

The client device 214, 216 may further include one or more graphical user interfaces (GUIs) 718. For example, the visual representations 622 may be presented via the GUIs 718 and/or a user may be able to request sensor data from one or more of the A/V devices 210 via the GUIs. The GUIs 718 may be used to access, control, and/or make updates to one or more components of the system 200 (e.g., the A/V device 210, the hub device 202, the VA device 208, the automation devices 206, the sensors 204, the electronic device(s) 230, the light emitter(s) 232, etc.). The GUIs 718 may be included within one or more device application(s) 714. For example, different components of the system 200 may have different device applications 714 for allowing access to, control of, and updates to the components. In some examples, the device application 714 may include a single application that is capable of access to, control of, and/or updates to some or all of the components of the system 200.

FIGS. 8A-8C, 9A, and 9B illustrate example graphical user interfaces on a display 716 of the client device 214 with which a user may create and/or configure device associations. In various embodiments, any of the GUIs of FIGS. 8A-8C, 9A, and 9B may correspond to one of the GUI(s) 718. Although the display 716 is shown on the client device 214, in embodiments of this disclosure the client device 214 could be replaced with another interactive device, including but not limited to the hub device 202, the VA device 208, or the like.

Figure 8A:
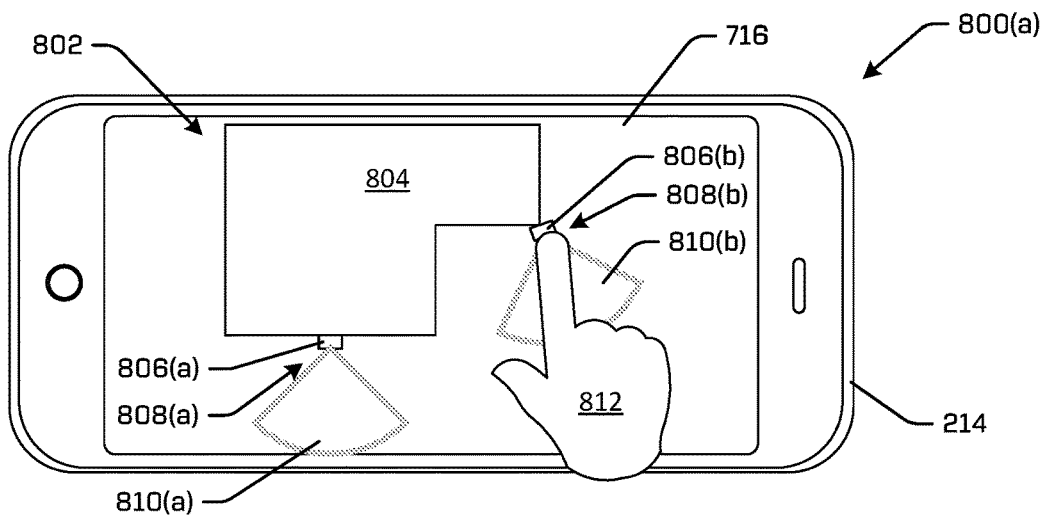
FIGS. 8A-8C and 9A-9B are visual representations illustrating further example embodiments of GUIs for associating security devices according to various aspects of the present disclosure.

As illustrated in FIG. 8A, the first GUI 800(a) includes an example map 802, which corresponds to a visual representation 622, for example, and which may be generated by the visual representation generation component 620. The map 802 is an example overhead visual representation of a property, or at least a portion thereof. More specifically, the map 802 includes an overview of a parcel of land and a building footprint 804. While the illustrated embodiment includes only a single building footprint, other buildings (and/or other features of the geographic area, e.g., roads and trees) associated with the geographic area, as well as adjacent properties or the like, may also be illustrated.

The map 802 also includes a first A/V device graphical representation 806(a) and a second A/V device graphical representation 806(b) (collectively the A/V device graphical representations 806). The first A/V device graphical illustration 806(a) illustrates a first A/V device, such as one of the A/V devices 210, installed at a first location 808(a) on the property and having a first field of view 810(a). The second A/V device graphical illustration 806(b) illustrates a second A/V device, such as one of the A/V devices 210, installed at a second location 808(b) on the property and having a second field of view 810(b). In some aspects of the present embodiments the fields of view 810 are illustrative of the true coverage area, or range, of the video cameras of the respective A/V devices 210 represented by the A/V device graphical representations 806. Alternatively, the field of view representations 810 may be merely representative, e.g., of a general shape, size, and/or direction of a field of view associated with the installed devices. In other embodiments, the fields of view 810 may show the coverage area (or monitoring range) of one or more motion sensors (e.g., passive infrared (PIR) sensors) of the A/V devices 210. In yet other embodiments, for some or all of the A/V devices 210, both the coverage area of the sensors and the coverage area of the video cameras may be displayed on the property map 802. By way of non-limiting example, the fields of view 810 may extend much farther from the respective devices than illustrated. In some examples, the shape and/or extent of the representations of the fields of view 810 may be determined based on the A/V device data 610, e.g., the field of view data 614.

The map 802 may be generated using the map data 624. For example, the map data 624 for the geographic area, in some of the present embodiments, may be requested and received from a vendor of such data (e.g., a third-party vendor, such as Google Maps, Google Earth, Apple Maps, etc.). In some embodiments, the data for land parcels may be received from a first vendor (e.g., city, state, and/or local offices, such as permitting offices), while the data for the building footprints may be received from a second, different vendor (e.g., a construction company, a builder, etc.). In other embodiments, the data for land parcels may be received from the same vendor as the data for the building footprints. In some examples, the map data 624 may be used to provide a general layout of the map 802, whereas the device data 610 may be used to augment the map data 624, e.g., by informing locations of the A/V device representations 806. As also illustrated in FIG. 8A, a user 812 is interacting with the first GUI 800(a) to select the second graphical representation 806(b), e.g., by touching the display 716 at a location corresponding to the second graphical representation 806(b).

Figure 8B:
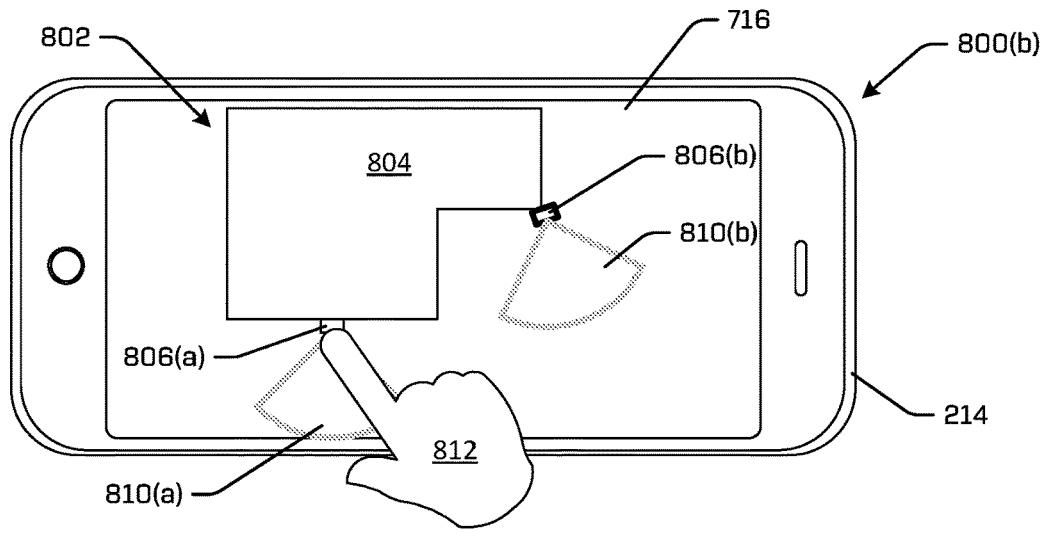

Upon receiving information associated with the user 812's selection of the second graphical representation 806(b) of the second A/V device 210, the client device 214 may update the display 716 to render or otherwise display a second GUI 800(b), as shown in FIG. 8B. As illustrated, the second GUI 800(b) includes the map 802, building footprint 804, device representations 806, and field of view representations 810. The second device representation 806(b) and the second field of view representation 810(b) are highlighted, e.g., to provide a visual indication to the user that the second device representation 806(b) has been selected. Although FIG. 8B shows both the second device representation 806(b) and the second field of view representation 810(b) as being highlighted, other visual indicators may be used to confirm selection of the second device representation 806(b). By way of non-limiting example, only one or the other of the second device representation 806(b) and the second field of view representation 810(b) may be highlighted, one or both of the second device representation 806(b) and the second field of view representation 810(b) may be altered visually in a different manner, an animation or additional icon may be associated with the second device representation 806(b) and/or the second field of view representation 810(b), a pop-up window or similar graphic may be provided confirming the selection, or the like.

Figure 8C:
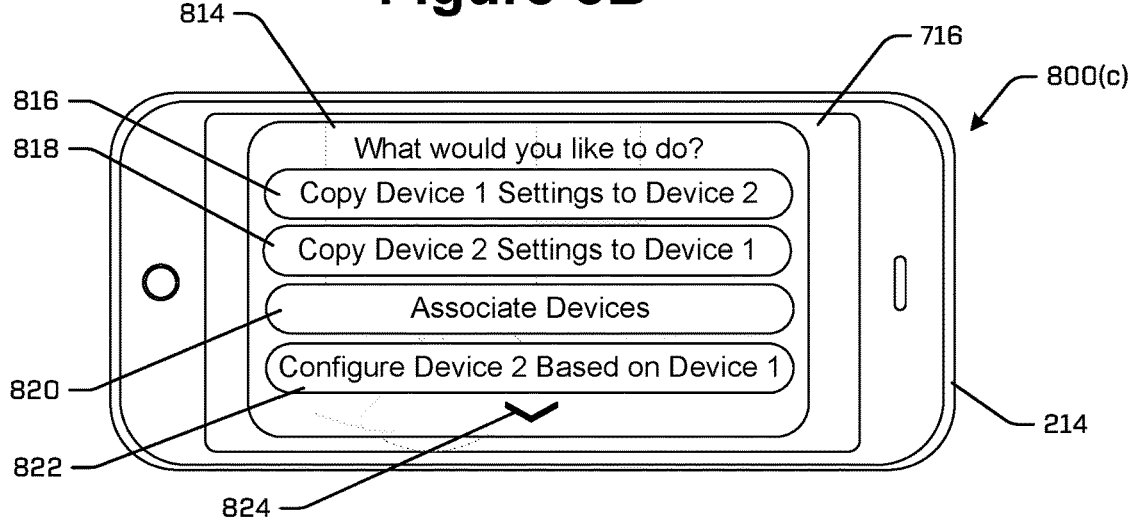

As also illustrated in the example of FIG. 8B, the user 812 is interacting with the second GUI 800(b) to select the first graphical representation 806(a), e.g., by touching the display 716 at a location corresponding to the first graphical representation 806(a). Thus, the user 812 has selected the second graphical representation 806(b) in FIG. 8A followed by the first graphical representation 806(a) in FIG. 8B. Such consecutive or serial selection of the device representations 806(b), 806(a) by the user 812 may cause a third GUI 800(c) to be displayed on the display 716, as shown in FIG. 8C.

The third GUI 800(c) may include an interactive list 814 or other grouping of interactive control elements 816, 818, 820, 822 (e.g., buttons). This disclosure is not limited to the illustrated control elements 816, 818, 820, 822, and, as illustrated, the third GUI 800(c) may also include a control 824 that allows a user to scroll through additional controls, each selectable by the user 812 to perform a different function with respect to the two selected A/V devices 210. For example, selection of the first control element 816 may copy device settings of the first A/V device 210, represented by the first device representation 806(a), to the second A/V device 210 represented by the second device representation 806(b). Similarly, selection of the second control element 818 may copy device settings of the second A/V device 210 to the first A/V device 210. More specifically, selection of the first control element 816 may cause the first A/V device 210 to transmit information about its settings to the second A/V device 210, e.g., via the network 218 or via a direct connection, and selection of the second control element 818 may cause the second A/V device 210 to transmit information about its settings to the first A/V device 210.

In other embodiments, the client device 214, a hub device 202, or some other device may execute instructions to copy the settings from the first A/V device 210 to the second A/V device 210, or vice versa. For example, the client device 214 may query the first A/V device 210 for its settings and/or preferences, and/or access the first A/V device 210 settings/preferences from a database, and configure the second A/V device 210 according to those settings/preferences. Some settings that may be applied across multiple devices can include settings related to notifications, e.g., those generated by and/or transmitted from the device when motion is detected, settings related to power-consumption, e.g., how long a light should stay on after being activated, settings related to data storage, e.g., how long a device records or transmits video after being activated, settings related to video resolution, settings related to audio fidelity, privacy settings, settings relating to sharing, e.g., permissions for accessing data captured and/or stored by the device(s), and/or the like.

Figure 9A:
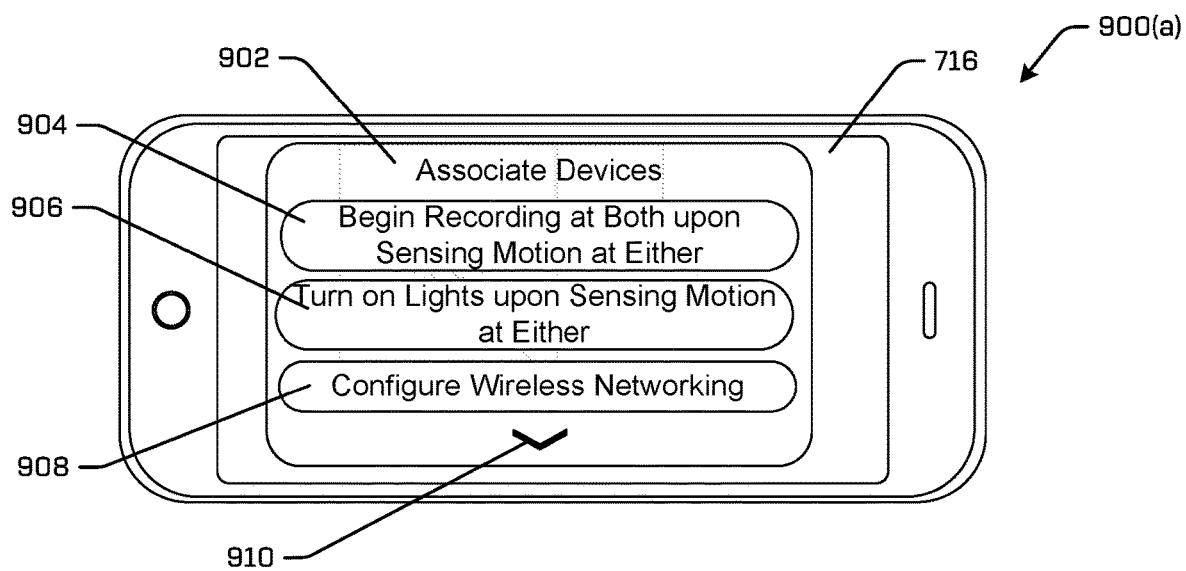
Figure 9B:
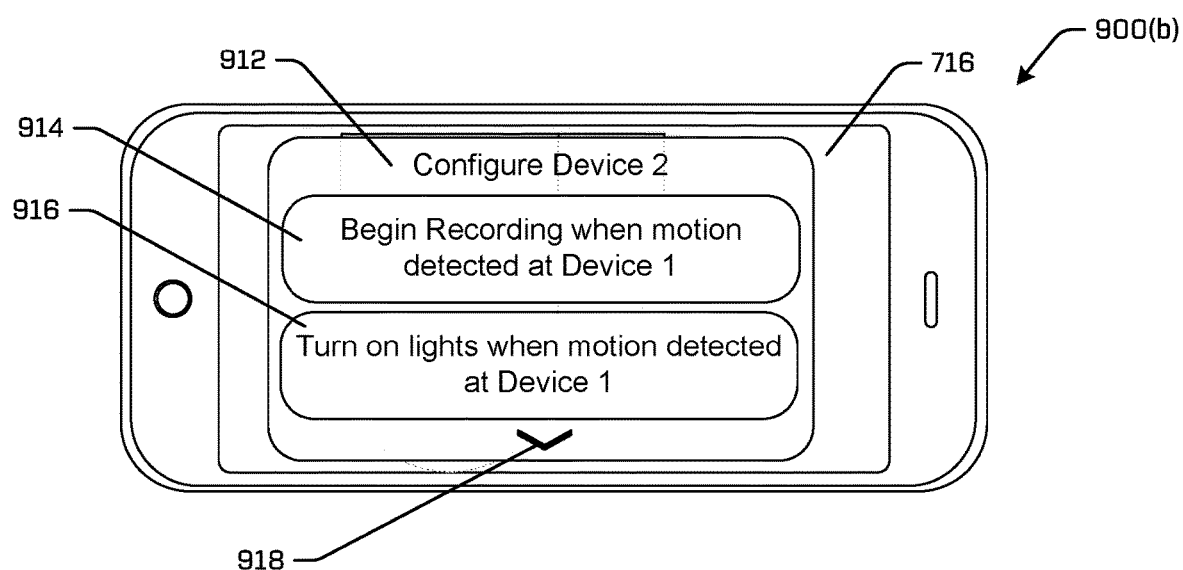

FIGS. 9A and 9B illustrate additional example GUIs according to embodiments of this disclosure. More specifically, FIG. 9A illustrates a fourth GUI 900(a) that may be displayed upon selection of the third control element 820 in FIG. 8C, and FIG. 9B illustrates a fifth GUI 900(b) that may be displayed upon selection of the fourth control element 822.

As illustrated in FIG. 9A, the fourth GUI 900(a) may include an interactive list 902 or other grouping of interactive control elements 904, 906, 908 (e.g., buttons) presented on the display 716 in response to a user selection of the third control element 820 from the third GUI 800(c). This disclosure is not limited to the illustrated control elements 904, 906, 908, and, as illustrated, the fourth GUI 900(a) may also include a control 910 that allows a user to scroll through additional controls, each selectable by a user to perform a different function with respect to the two selected devices. More specifically, each of the control elements 904, 906, 908 may be associated with a specific function that relates to associating functionality of the A/V devices 210 represented by the serially-selected (or otherwise associated) device representations 806(a), 806(b). For example, selection of the fifth control element 904 may cause the selected devices to each be configured to begin recording when motion is detected at either of the devices. In some embodiments, a factory-default setting for the A/V devices 210 described herein may cause the A/V device 210 to begin generating image data 406 when motion is detected, e.g., by a motion sensor or by the device's camera. However, selection of the fifth control element 904 may override or supplement the factory-default setting, such that the example A/V device 210 will generate image data 406 when motion is detected at that same A/V device 210, and also when motion is detected at the other, associated A/V device 210. In some examples, the client device 214 may generate and output a signal to the A/V devices 210 instructing each of the A/V devices 210 to reconfigure their settings such that motion at either of the A/V devices 210 causes the cameras of both A/V devices 210 to begin generating image data 406.

In other examples, selection of the sixth control element 906 may cause the selected A/V devices 210 to each be configured to turn on lights when motion is detected at either of the A/V devices 210. In some embodiments, A/V devices 210 described herein may include one or more lights, e.g., floodlights, and factory-default settings may cause the A/V device 210 to turn on the light(s) when motion is detected, e.g., by a motion sensor or by the device's camera. However, selection of the sixth control element 906 may override or supplement the factory-default setting, such that the example A/V device 210 will activate its light(s) when motion is detected at that same A/V device 210, and also when motion is detected at the other, associated A/V device 210. In some examples, the client device 214 may generate and output a signal to the A/V devices 210 instructing each of the A//V devices 210 to reconfigure their settings such that motion at either of the A/V devices 210 causes the light(s) at both A/V devices 210 to illuminate. Thus, the sixth control element 906 may enhance safety at the property by illuminating a broader area when someone or something is detected by either of the A/V devices 210.

With continued reference to FIG. 9A, selection of the seventh control element 908 may cause the selected A/V devices 210 to configure wireless networking, e.g., between the A/V devices 210. For example, selecting the seventh control element 908 may configure the selected A/V devices 210 to communicate with one another directly, e.g., by authenticating the A/V devices 210 with each other and/or with a local wireless network. Moreover, the seventh control element 908 may cause one of the A/V devices 210 to transmit information, e.g., authentication information, to the other of the A/V devices 210. More specifically, selection of the seventh control element 908 may cause a first one of the selected A/V devices 210 to transmit information about a wireless network to which the first one of the A/V devices 210 is connected to the other of the selected A/V devices 210, with the other A/V device 210 using the information to join the same network. In some examples, the wireless communication may allow one of the A/V devices 210 to transmit a signal indicative of detected motion at the one of the A/V devices 210 to another one of the A/V devices 210, e.g., so the other A/V device 210 can begin recording, illuminate one or more light sources, and/or take some other action. In other embodiments, associations other than, or in addition to, those illustrated by the control elements 904, 906, 908 may also be enabled by the fourth GUI 900(a). For example, and without limitation, other functionalities, settings, and/or properties of one of the A/V devices 210 may be shared and/or distributed to the other A/V device 210 according to the techniques described herein.

As illustrated in FIG. 9B, the fifth GUI 900(b) may include an interactive list 912 or other grouping of interactive control elements 914, 916 (e.g., buttons) presented on the display 716 in response to a user selection of the fourth control element 822 on the third GUI 800(c). This disclosure is not limited to the illustrated control elements 914, 916 and, as illustrated, the fifth GUI 900(b) may also include a control 918 that allows a user to scroll through additional controls, each selectable by a user to perform a different function with respect to the two selected A/V devices 210. More specifically, each of the control elements 914, 916 may be associated with a specific function that relates to associating functionality of the second A/V device 210 represented by the second device representation 806(b) with functionality of the first A/V device 210 represented by the first device representation 806(a). For example, selection of the eighth control element 914 may cause the second A/V device 210 to be configured to begin generating and/or transmitting image data 406 when motion is detected at the first A/V device 210. Thus, in this example, selection of the eighth control element 914 may override or supplement previous settings of the second A/V device 210, such that the second A/V device 210 will generate and/or transmit image data 406 when motion is detected at the first A/V device 210 (e.g., in addition to when motion is detected at the second A/V device 210). In some examples, the client device 214 (and/or a network device) may generate and output a signal to the second A/V device 210 with instructions to reconfigure its settings such that motion at the first A/V device 210 causes the camera 314 of the second A/V device 210 to begin recording image data 406 and/or causes the second A/V device 210 to begin transmitting the image data 406.

With further reference to FIG. 9B, selection of the ninth control element 916 may cause the second A/V device 210 represented by the second device representation 806(b) to be configured to activate one or more lights when motion is detected at the first A/V device 210 represented by the first device representation 806(a). Thus, in this example, selection of the ninth control element 916 may override or supplement previous settings of the second A/V device 210, such that the second A/V device 210 will activate (e.g., provide power to, begin emitting light with, etc.) at least one light when motion is detected at the first A/V device 210 (e.g., in addition to when motion is detected at the second A/V device 210). In some examples, the client device 214 (and/or a network device) may generate and output a signal to the second A/V device 210 with instructions to reconfigure its settings such that motion at the first A/V device 210 causes the second A/V device 210 to activate the at least one light.

As just described, the eighth control element 914 may result in similar functionality to the fifth control element 904 discussed above, and the ninth control element 916 may result in similar functionality to the sixth control element 906, but on a device-by-device basis, instead of applying the same rule to both devices. In other examples, a user may also be able to configure the first A/V device 210 to change its settings to match those of the second A/V device 210, e.g., by selection of a different (and non-illustrated) control on the third GUI 800(c).

In the example of FIGS. 8A-8C, two devices are associated by serial selection. In contrast, in the example of FIGS. 1A-1C discussed above, the devices are associated by clicking and dragging. These are but two examples of associating representations on the display 716, and either or both may be used in various embodiments. For example, the clicking-and-dragging technique of FIGS. 1A-1C may be used to associate the device representations 806(a), 806(b) on the first GUI 800(a). Moreover, other modifications are contemplated. For example, an intermediate GUI (not shown) may be displayed between the first GUI 800(a) and the second GUI 800(b), and the intermediate GUI may prompt the user to make an association via the selection shown in FIG. 8B. For example, upon selecting the second device representation 806(b), as shown in FIG. 8A, the display 716 may show a prompt, e.g., a prompt asking the user if she would like to associate the second A/V device 210 with another device. If the user selects "YES," the second GUI 800(b) may then be displayed, and the user can make the selection as shown in FIG. 8B. The prompt may also allow the user to perform device-specific actions. By way of non-limiting example, upon selecting the second device representation 806(b), as shown in FIG. 8A, a prompt may ask the user if she would like to perform actions specific to the second A/V device 210, e.g., to see a live video feed from the second A/V device 210, to configure the second A/V device 210, or the like. Thus, the option to associate the second A/V device 210 with other A/V devices may be in addition to other, device-specific options.

Although the examples of FIGS. 1A-1C and 8A-9B describe associating A/V devices 210 and/or updating settings associated with A/V devices 210, in other examples similar processes and/or techniques may be used to associate other types of devices and/or update settings associated with other types of devices. For example, similar processes and/or techniques may be used to associate a first device (e.g., the hub device 202, a sensor 204, an automation device 206, an A/V device 210, an electronic device 230, a light emitter 232) with a second device (e.g., the hub device 202, a sensor 204, an automation device 206, an A/V device 210, an electronic device 230, a light emitter 232). Additionally, similar processes and/or techniques may be used to share settings between a first device (e.g., the hub device 202, a sensor 204, an automation device 206, an A/V device 210, an electronic device 230, a light emitter 232) and a second device (e.g., the hub device 202, a sensor 204, an automation device 206, an A/V device 210, an electronic device 230, a light emitter 232).

For example, the client device 214 may display a visual representation 622 (FIG. 6) that includes a representation of an electronic device 230 and representation(s) of light emitters 232. The client device 214 may then receive an input associating the light emitters 232 with the electronic device 230, using the processes and techniques described herein. Additionally, the client device 214 may receive an input to share settings between the light emitters 232, such that the light emitters 232 function similarly to one another. For example, each of the light emitters 232 may activate (e.g., power on, emit light, etc.) based on the occurrence of an event, such as motion being detected at another device (e.g., A/V device 210, one of the light emitters 232, etc.). The client device 214 may then transmit control signal(s) 420 to the electronic device 230 and/or the light emitters 232 (which may be via a backend server 224) that configure the electronic device 230 and/or the light emitters 232 according to the input.

Figure 10A:
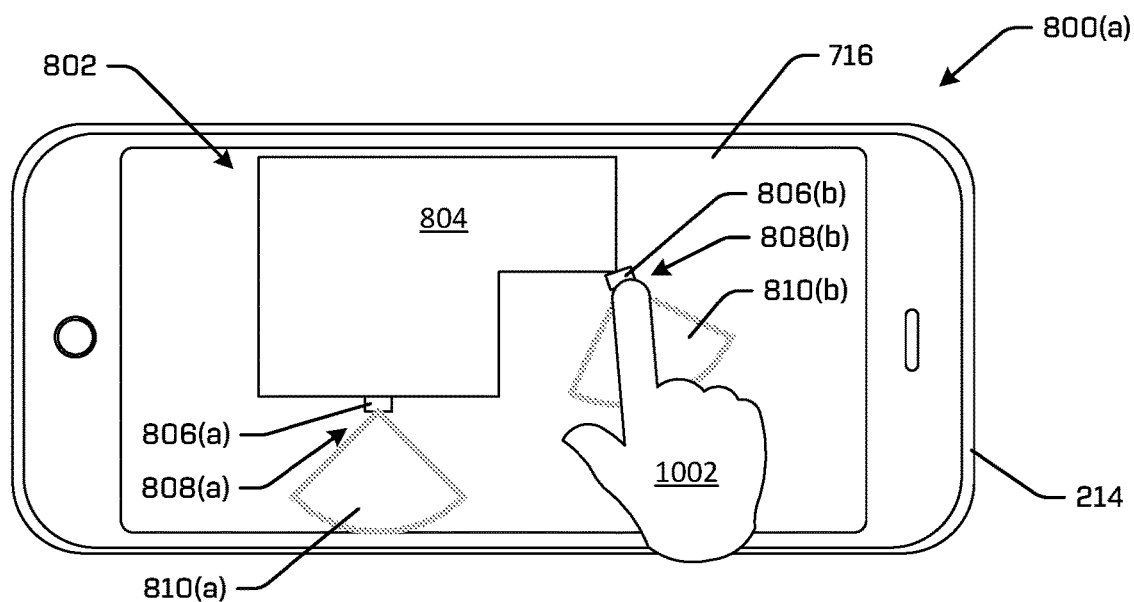
FIGS. 10A and 10B are visual representations illustrating further example embodiments of GUIs for configuring devices according to various aspects of the present disclosure.
Figure 10B:
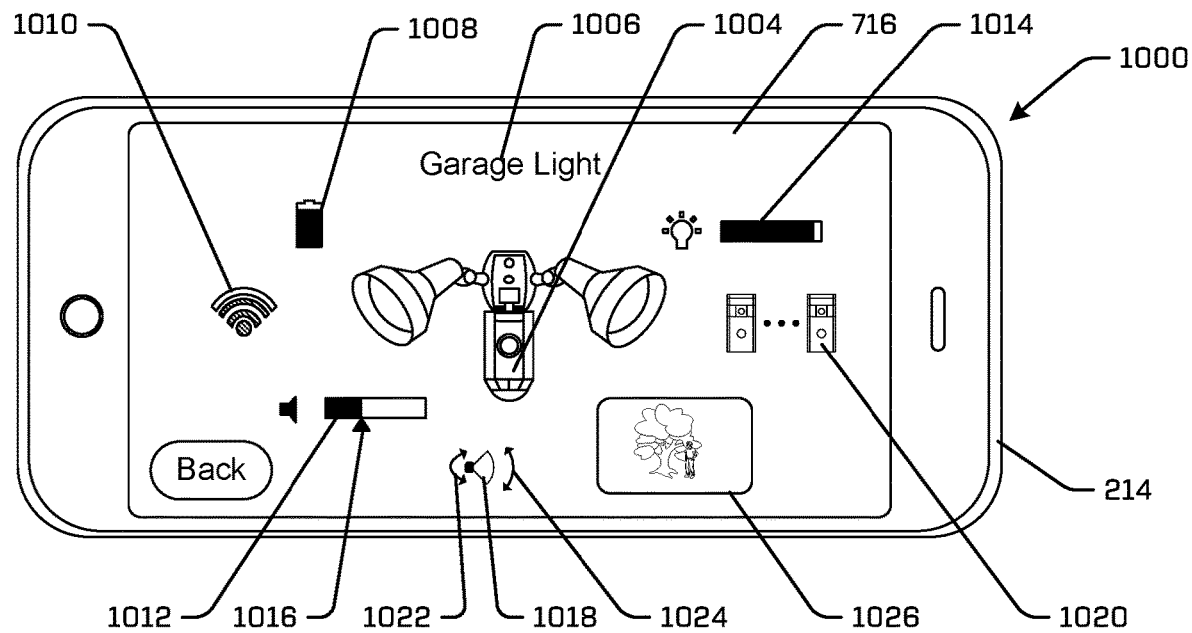

Additional aspects of the disclosure are shown in FIGS. 10A and 10B. Specifically, FIGS. 10A and 10B illustrate example interactive GUIs providing additional functionality. FIG. 10A may be substantially the same as FIG. 8A, so the same reference numerals are carried over to FIG. 10A from FIG. 8A. For instance, FIG. 10A illustrates the first GUI 800(a) including the example map 802 as an overhead view of a parcel of land and the building footprint 804. The map 802 includes the first A/V device graphical representation 806(a) at the first location 808(a) and having the first field of view 810(a), and the second A/V device graphical representation 806(b) at the second location 808(b) and having the second field of view 810(b). Other details of the map 802 are described above, and will not be repeated here.

As also illustrated in FIG. 10A, a user 1002 is interacting with the first GUI 800(a) to select the second graphical representation 806(b), e.g., by touching the display 716 at a location corresponding to the second graphical representation 806(b). Upon receiving information associated with the user 1002's selection of the second graphical representation 806(b) of the second A/V device 210, the client device 214 may update the display 716 to render or otherwise display a second GUI 1000, as shown in FIG. 10B. As illustrated, the second GUI 1000 includes a device graphical representation 1004, which may be a picture or other representation of the type of the second A/V device 210 (a floodlight camera in the illustration), and various types of information associated with the second A/V device 210. For instance, the second GUI 1000 may include a textual description 1006 of the second A/V device 210. In the illustration, the textual description 1006 may be a name or title associated with the second A/V device (here "Garage Light"). The second GUI 1000 may also include a battery life indicator 1008, a signal strength indicator 1010, a volume indicator 1012, and/or a brightness indicator 1014. For example, the battery life indicator 1008 may provide a visual indication of a remaining battery life of the second A/V device 210, the signal strength indicator 1010 may provide a visual indication of a connection strength, e.g., to a router or a hub device, the volume indicator 1012 may provide a visual indication of a volume of a speaker associated with the second A/V device 210, and/or the brightness indicator 1014 may provide a visual indication of a brightness of a light source associated with second A/V device 210.

In addition to providing a visualization of their respective attributes, the battery life indicator 1008, the signal strength indicator 1010, the volume indicator 1012, and/or the brightness indicator 1014 may also be interactive representations. For example, the user 1002 may interact with the respective indicators to perform one or more actions. By way of non-limiting example, the user 1002 may select the battery life indicator 1008 to receive additional information about the battery of the second A/V device 210. For instance, the additional information may include a numerical indication, e.g., a percentage, of the remaining battery life. Alternatively, the numerical indication may be included on the second GUI 1000. In other examples, the additional information about the battery may include a description of the battery, e.g., a battery type, and/or a link to purchase a replacement battery, e.g., via an electronic marketplace or the like. Selection of the signal strength indicator 1010 may allow the user 1002 to configure connectivity settings for the second A/V device 210. For instance, the user 1002 may select alternate networks to join and/or enable/disable connectivity according to different protocols. The user 1002 may be able to configure the volume via the volume indicator 1012 and/or brightness via the brightness indicator 1014. In the illustration, the volume indicator 1012 and/or the brightness indicator 1014 may be "slide" type controls including a level indicator 1016 (shown on the volume indicator 1012) via which the user 1002 may change the volume/brightness by contacting the display 716 at the position of the level indicator 1016 and sliding the level indicator 1016, e.g., to the right to increase the volume or to the left to decrease the volume. Of course, the slide controls/level indicator 1016 are but one example via which the user 1002 may alter the respective speaker/lighting settings; other examples are contemplated.

The second GUI 1000 may also include additional interactive controls. For example, FIG. 10B also illustrates a position/field of view control 1018 and a vehicle association control 1020. The user 1002 may interact with the position/field of view control 1018 to alter parameters of the lights and/or camera associated with the second A/V device 210. For example, FIG. 10B shows a first arrow control 1022 via which the user may control a rotational position of the device. In some examples, selection of the arrow control 1022 proximate an end thereof may cause one or more signals to be sent to the second A/V device 210 to swivel or rotate the second A/V device 210 in a corresponding direction. For instance, the second A/V device 210 may include a motor, such as a servo-motor or the like, that causes the light source(s) and/or the camera to rotate incrementally within a range. FIG. 10B also shows a second arrow control 1024 via which the user may control aspects of the camera only. For instance, the user 1002 may interact with the second arrow control 1024 to rotate the camera's field of view. The first arrow control 1022 and the second arrow control 1024 are for example only, as other or different controls may also or alternatively be provided. For example, if the second A/V device 210 includes a camera having a zoom function, such zoom functioning may also or alternatively be controllable by the position/field of view control 1018. In still other examples, selection of the position/field of view control 1018 may open a new GUI with expanded control functionality. Selection of the vehicle association control 1020 may similarly launch a separate GUI, which may show associations of the second A/V device 210, including but not limited to the associations generated via the GUIs 900(a), 900(b), discussed above.

The second GUI 1000 may also include a feed 1026, which may be a window showing a real-time (e.g., as allowable per video generation, transmission, reception, and/or display technologies) or near real-time video from the second A/V device 210. In other implementations, the feed 1026 may include a most recent video frame or other still representation of an image captured by the second A/V device 210. For example, the feed 1026 may provide the user 1002 with near instantaneous feedback when the user 1002 makes changes to aspects of the second A/V device 210, e.g., using the various controls included in the GUI 1000. In some implementations, selection of the feed 1026 (e.g., by tapping on the display 716 in the area of the feed 1026) may cause the display 716 to display video from the second A/V device 210 on a larger scale, e.g., full-screen.

Accordingly, the GUI 1000 may provide an interface via which the user 1002 can check and/or change settings associated with a single device, e.g., the second A/V device 210. The representations and controls in the GUI 1000 are representative only, as fewer than the illustrated representations may be provided. Alternative or additional controls also may be provided in the GUI 1000. By way of non-limiting example, controls can also be provided to display and/or change an output sound associated with second A/V device 210, motion detection settings, notifications, or the like. In implementations, any variable and/or quantifiable aspects associated with the second A/V device 210 may be included in and/or may be modifiable via the GUI 1000.

Each of the processes described herein, including the processes 1000 and 1100 are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

Figure 11:
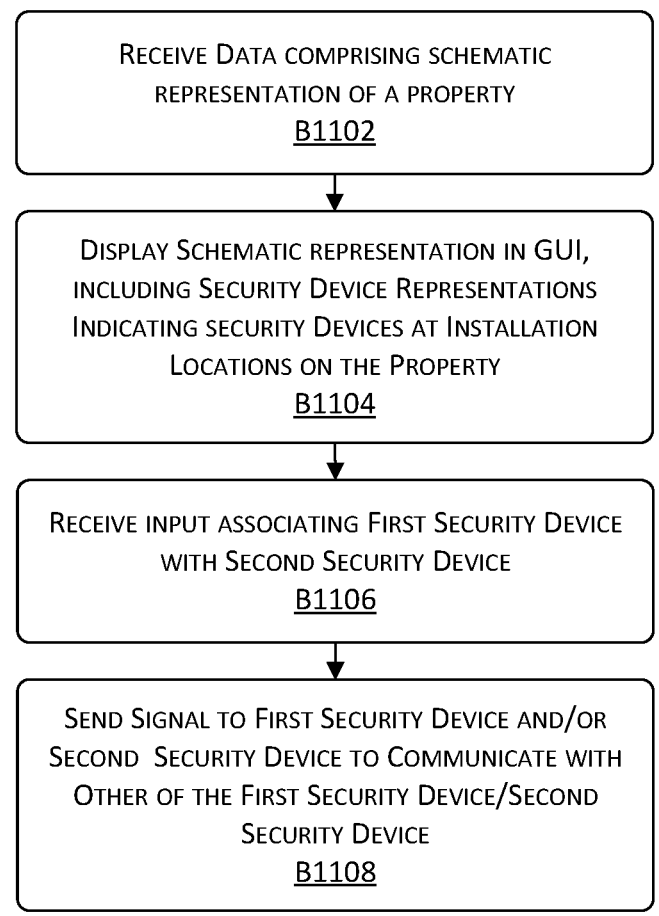
FIGS. 11 and 12 are flowcharts illustrating example processes for associating security devices at a property according to various aspects of the present disclosure.

FIG. 11 is a flowchart illustrating a process 1100 for associating security devices. The process 1100 may be carried out by a client device, which may include any of the client device(s) 104, 214, 216, 232, for example.

At block B1102, data comprising a visual representation of a property is received. For example, the processor 702 of the client device 214, 216 may, using the network interface 710, receive the visual representation(s) 622 described herein. The visual representation(s) 622 may include representations of features on a property and representations of A/V devices 210 installed on the property. The visual representation 106 illustrated in FIG. 1 and the map 802 illustrated in FIGS. 8A and 8B are examples of visual representations. In some examples, the client device 214, 216 may receive the data representing the visual representation(s) 622 from a network device, such as the backend server 224 and/or the hub device 202.

At block B1104, the visual representation is displayed in a graphical user interface (GUI), the GUI including security device representations indicating security devices at installation locations on the property. For example, the processor 702 of the client device 214, 216 may cause the visual representation(s) 622 to be displayed on the GUI 718 and/or the processor 702 of the client device 214, 216 may cause the map 802 to be displayed on the GUI 718. In examples, the security device representations may be displayed as interactive elements, e.g., like the hub device representation 110, the security device representations 112, 114, and the security device representations 806(a), 806(b), or as some other control(s) associated with one of the representations. The security devices may include, but are not limited to, the hub device 202, sensor(s) 204, automation device(s) 206, A/V device(s) 210, electronic device(s) 230, light emitter(s) 232, and/or the like.

At block B1106 a user input associating a first security device with a second security device is received. For example, the processor 702 of the client device 214, 216 may receive, via the input interface 704 on the display 716, an input that associates two of the representations, e.g., two of the representations 112, 114, 116 on the GUI 100(a), or the representations 806(a), 806(b) on the first GUI 800(a). For example, the association may be made via a click-and-drag operation, as in the example of FIGS. 1A-1C, via a serial selection, as in the example of FIGS. 8A-8C, or via other mechanisms.

At block B1108, a signal is transmitted to the first security device and/or the second security device to communicate with the other of the first security device or the second security device. For example, the processor 702 of the client device 112, 214, 216 may generate and transmit, using the network interface 710, a control signal 420 to the first security device and/or the second security device (which may be via a network device) associated by the user input, and the control signal 420 may instruct the security device(s) to communicate with each other. For instance, the control signal 420 may include an instruction to the security device(s) to join a wireless network, to provide authentication information, to establish a direct wireless communication channel with one another, e.g., via Bluetooth, near-field communication, or the like. In some examples, as in FIG. 1, the to-be-associated security devices may include a peripheral security device, e.g., an A/V device 210, and a central security device, e.g., a hub device 202, and the signal sent at B1108 may include an instruction for the peripheral security device to provide information to, receive commands from, and/or otherwise be controllable at the hub device 202.

The process 1100 of FIG. 11 may be implemented in a variety of embodiments, including those discussed above. However, the below-detailed embodiments are not intended to be limiting, and are provided merely as example embodiments of the present disclosure. Other embodiments similar to those outlined herein may also fall within the scope of the present disclosure.

For example, and with reference to FIG. 1, a user may have recently installed a new security device on his/her property. The security device may be a floodlight camera 210(b), for example, and upon installation and/or powering up, the floodlight camera 210(b) may be discovered by the client device 104 and/or a backend server 224, e.g., over a wireless network. In response to discovering the floodlight camera 210(b), the client device 104 may receive data corresponding to a visual representation of the property on which the floodlight camera 210(b) is installed (at block B1102). For example, the client device 104 and/or the backend server 224 may store a visual representation of the property before installation of the floodlight camera 210(b), and may update the visual representation with information about the floodlight camera 210(b) upon discovery. For example, the floodlight camera 210(b) may transmit GPS information useful to position a graphical representation of the floodlight camera 210(b), e.g., the representation 114 in FIG. 1, on the property. The user device 104 may then display the visual representation 106 (at block B1104), which includes the representation 114 of the newly-installed floodlight camera 210(b), as well as representations of other, e.g., already-installed, devices, such as the hub representation 110 and the security device representation 112.

Having displayed the GUI 106, the client device 104 may then receive a user input associating the floodlight camera 210(b) with the hub device 202 and/or another A/V device 210 (at block B1106). For instance, the user may desire to associate the newly-installed floodlight camera 210(b) with a hub device 202, e.g., to allow the user to monitor and/or control the floodlight camera 210(b) at the hub device 202. In some examples, the hub device 202 may include a wireless router and the user may desire to have the floodlight camera 210(b) associate with a wireless network maintained by the wireless router. In other examples, the user may desire to associate the newly-installed floodlight camera 210(b) with an already-installed A/V device 210. For example, the user may desire to have the floodlight camera 210(b) illuminate its light source in response to some action detected at the already-installed device. For example, when the already-installed device is a video doorbell 210(a), the floodlight camera 210(b) may be controlled to illuminate its light source in response to a user pressing a doorbell button or being detected in a field of view of a motion detector associated with the video doorbell 210(a). After receiving the request to associate the devices, the client device 104 may generate and transmit signals to the floodlight camera 210(b) and/or the other device(s) 202, 210 to effectuate the association (at block B1108). For example, the user device 104 may transmit one or more control signals that include information usable by the floodlight camera 210(b) to join or be authenticated to a wireless network, the user device may transmit configuration instructions representative of updated settings for the floodlight camera 210(b), or the like.

In the foregoing manner, it may be possible to improve the functioning of a security system by promoting simplified installation and/or reconfiguration. For example, a simple click-and-drag on a user interface can configure a newly-installed device. Moreover, techniques described herein may promote association of multiple devices in the security system. In some instances, the techniques described herein may allow for enhanced functionality of devices, e.g., by allowing a floodlight camera to illuminate lights in response to a condition other than motion detected by a sensor on the floodlight camera. In some scenarios described herein, each of a number of security devices can react to detection of an unwanted visitor at any (or all) of the devices, e.g., by illuminating light sources, commencing recording, outputting audio, or the like.

Figure 12:
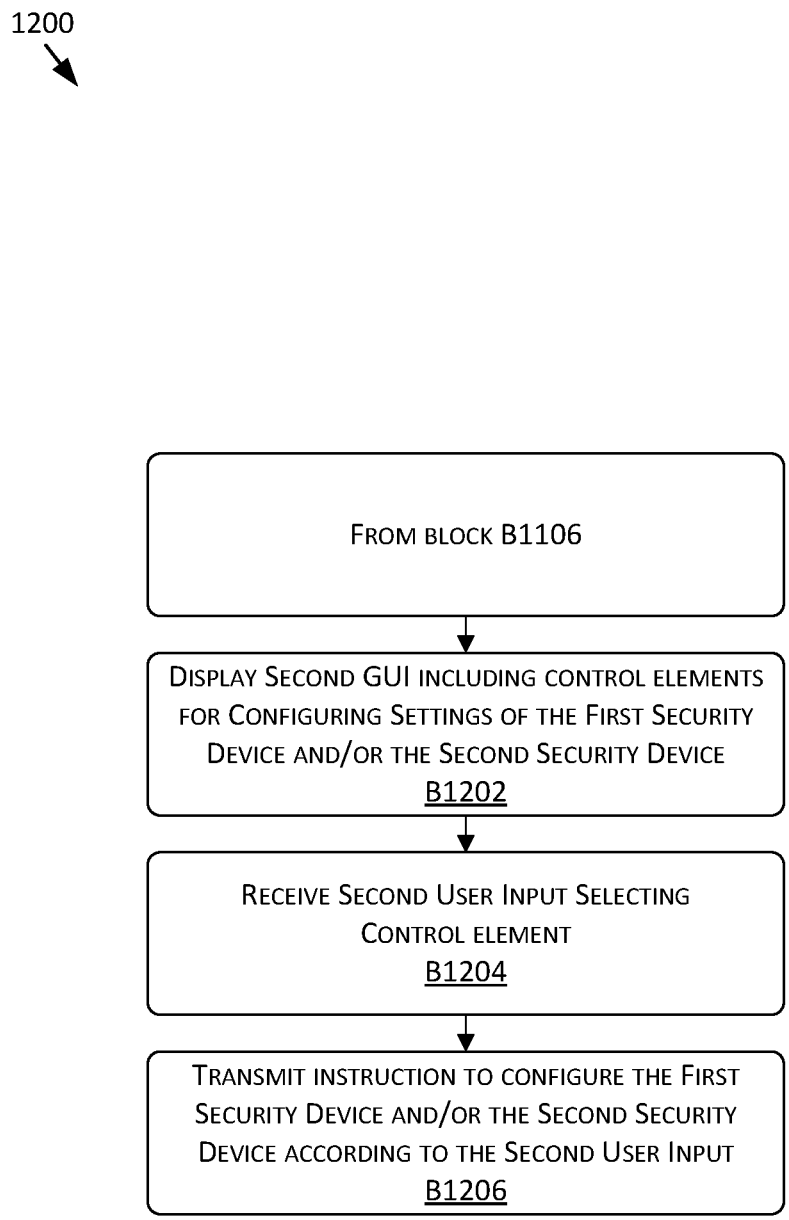

FIG. 12 is a flowchart illustrating a process 1200 for associating security devices. For instance, the process 1200 may be a modification of the process 1100, for example, with the blocks B1202, B1204, B1206 occurring after processing associated with the block B1106. The process 1200 may be carried out by a client device, which may include any of the client device(s) 104, 214, 216, 232, for example.

At block B1202, a second GUI including control element(s) for configuring settings of the first security device and/or the second security device is displayed. For example, the processor 702 of the client device 214, 216 may cause the second GUI 718 to be displayed on the display 716. The second GUI 718 may provide control elements, e.g., the control elements 816, 818, 820, 822, that allow a user to configure associations between the two security devices selected at block B1106. By way of non-limiting example, the control elements 816, 818, 820, 822 may allow for simultaneous configuration of both selected security devices, e.g., by allowing a user to configure both security devices in the same or similar manner, or for configuration of only one of the security devices, e.g., relative to the other security device. An example of the former is shown in FIG. 9A, and FIG. 9B shows an example of the latter.

At block B1204, a second user input selecting a control element is received. For example, the processor 702 of the client device 214, 216 may receive, via the input interface 704 on the display 716, a selection of one of the control elements 816, 818, 820, 822, 904, 906, 908, 914, 916. As noted, the selected control may correspond to a desired functionality, setting, or the like, relating to the security devices associated at block B1106.

At block B1206, an instruction to configure the first security device and/or the second security device according to the second user input is transmitted. For example, the processor 702 of the client device 112, 214, 216 may generate and transmit, using the network interface 710, a control signal 420 to the first security device and/or the second security device associated by the user input, and the control signal 420 may include instructions or commands corresponding to the selected control. For instance, the control signal 420 may include an instruction to the security device(s) to alter their settings, to establish a wireless communication channel, e.g., via Bluetooth, near-field communication, a local wireless network, or the like. In some examples, as in FIGS. 8A-9B, the to-be-associated devices may include security devices, e.g., the A/V devices 210, and/or a central device, e.g., a hub device 202, and the signal sent at B1206 may include an instruction for one of the security devices to take some action, e.g., begin recording, turn on lights, or the like in response to receiving a signal indicating presence of an object in a field of view of a different security device. The signal sent at B1112 may also include an instruction to the other security device to transmit signals to the first security device in response to motion detected at the other security device.

In the foregoing manner, it may be possible to improve the functioning of a security system by promoting simplified installation and/or reconfiguration. For example, a simple click-and-drag on a user interface can configure a newly-installed device. Moreover, techniques described herein may promote association of multiple devices in the security system. In some instances, the techniques described herein may allow for enhanced functionality of devices, e.g., by allowing a floodlight camera to illuminate lights in response to a condition other than motion detected by a sensor on the floodlight camera. In some scenarios described herein, each of a number of security devices can react to detection of an unwanted visitor at any (or all) of the devices, e.g., by illuminating light sources, commencing recording, outputting audio, or the like.

The processes described herein, including the processes 1100 and 1200, provide for improved functioning associated with installed security devices, including installed A/V devices 210. For example, the systems and methods described may allow homeowners to more readily install security devices 210. For example, a user may be presented with a graphical user interface (GUI) 100(a) through which he or she can readily configure a newly-installed security device, e.g., by associating the security device with already-installed security device(s) and/or by copying settings from the already installed security device(s) to the newly-installed security device. Moreover, in embodiments described herein, already-installed security devices 210 may be associated with one another to provide enhanced security at the property, e.g., by extending functionality of the installed A/V devices 210. For example, a user may be presented with a GUI (e.g., the first GUI 800(a)) through which the user can readily visualize and associate already-installed security devices with one another. For example, the user may be able to extend the capabilities of one or more security devices, e.g., by having a first security device take an action responsive to a condition being met at a second security device. Thus, in embodiments of this disclosure, multiple security devices may be readily coordinated to further enhance security. Accordingly, a user may more intuitively manage his or her security system, because a visual overview of locations of sensors/devices 210 installed on the property may be more easily navigable than a list, or a presentation of buttons, for example. As a result of the enhanced display of the security devices and sensors at the property, the user may be more capable of appreciating, understanding, and associating the devices, even if the user has limited technical capabilities, thereby increasing the safety of the user's family, pets, and/or property, as well as the public safety.

Figure 13:
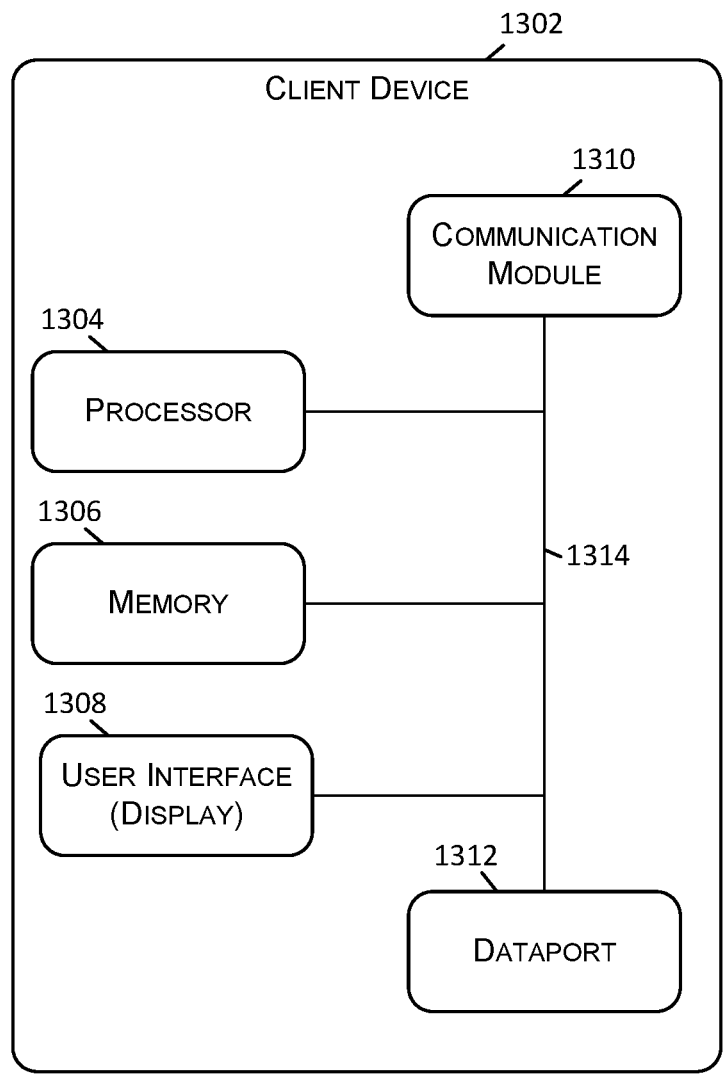
FIG. 13 is a functional block diagram of a client device on which the present embodiments may be implemented according to various aspects of the present disclosure.

FIG. 13 is a functional block diagram of a client device 1302 on which the present embodiments may be implemented according to various aspects of the present disclosure. The client device(s) 214, 216 described with reference to FIG. 2 may include some or all of the components and/or functionality of the client device 1302. The client device 1302 may comprise, for example, a smartphone.

With reference to FIG. 13, the client device 1302 includes a processor 1304, a memory 1306, a user interface 1308, a network interface 1310, and a dataport 1312. These components are communicatively coupled together by an interconnect bus 1314. The processor 1304 may include any processor used in smartphones and/or portable computing devices, such as an ARM processor (a processor based on the RISC (reduced instruction set computer) architecture developed by Advanced RISC Machines (ARM).). In some embodiments, the processor 2004 may include one or more other processors, such as one or more conventional microprocessors, and/or one or more supplementary co-processors, such as math co-processors.

The memory 1306 may include both operating memory, such as random-access memory (RAM), as well as data storage, such as read-only memory (ROM), hard drives, flash memory, or any other suitable memory/storage element. The memory 1306 may include removable memory elements, such as a CompactFlash card, a MultiMediaCard (MMC), and/or a Secure Digital (SD) card. In some embodiments, the memory 2006 may comprise a combination of magnetic, optical, and/or semiconductor memory, and may include, for example, RAM, ROM, flash drive, and/or a hard disk or drive. The processor 1304 and the memory 1306 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 1304 may be connected to the memory 1306 via the dataport 1312.

The user interface 1308 may include any user interface or presentation elements suitable for a smartphone and/or a portable computing device, such as a keypad, a display screen, a touchscreen, a microphone, and a speaker. The network interface 1310 is configured to handle communication links between the client device 1302 and other, external devices or receivers, and to route incoming/outgoing data appropriately. For example, inbound data from the dataport 1312 may be routed through the network interface 1310 before being directed to the processor 1304, and outbound data from the processor 1304 may be routed through the network interface 1310 before being directed to the dataport 1312. The network interface 1310 may include one or more transceiver components capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 1312 may be any type of connector used for physically interfacing with a smartphone and/or a portable computing device, such as a mini-USB port or an IPHONE®/IPOD® 30-pin connector or LIGHTNING® connector. In other embodiments, the dataport 1312 may include multiple communication channels for simultaneous communication with, for example, other processors, servers, and/or client terminals.

The memory 1306 may store instructions for communicating with other systems, such as a computer. The memory 1306 may store, for example, a program (e.g., computer program code) adapted to direct the processor 1304 in accordance with the present embodiments. The instructions also may include program elements, such as an operating system. While execution of sequences of instructions in the program causes the processor 1304 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 14:
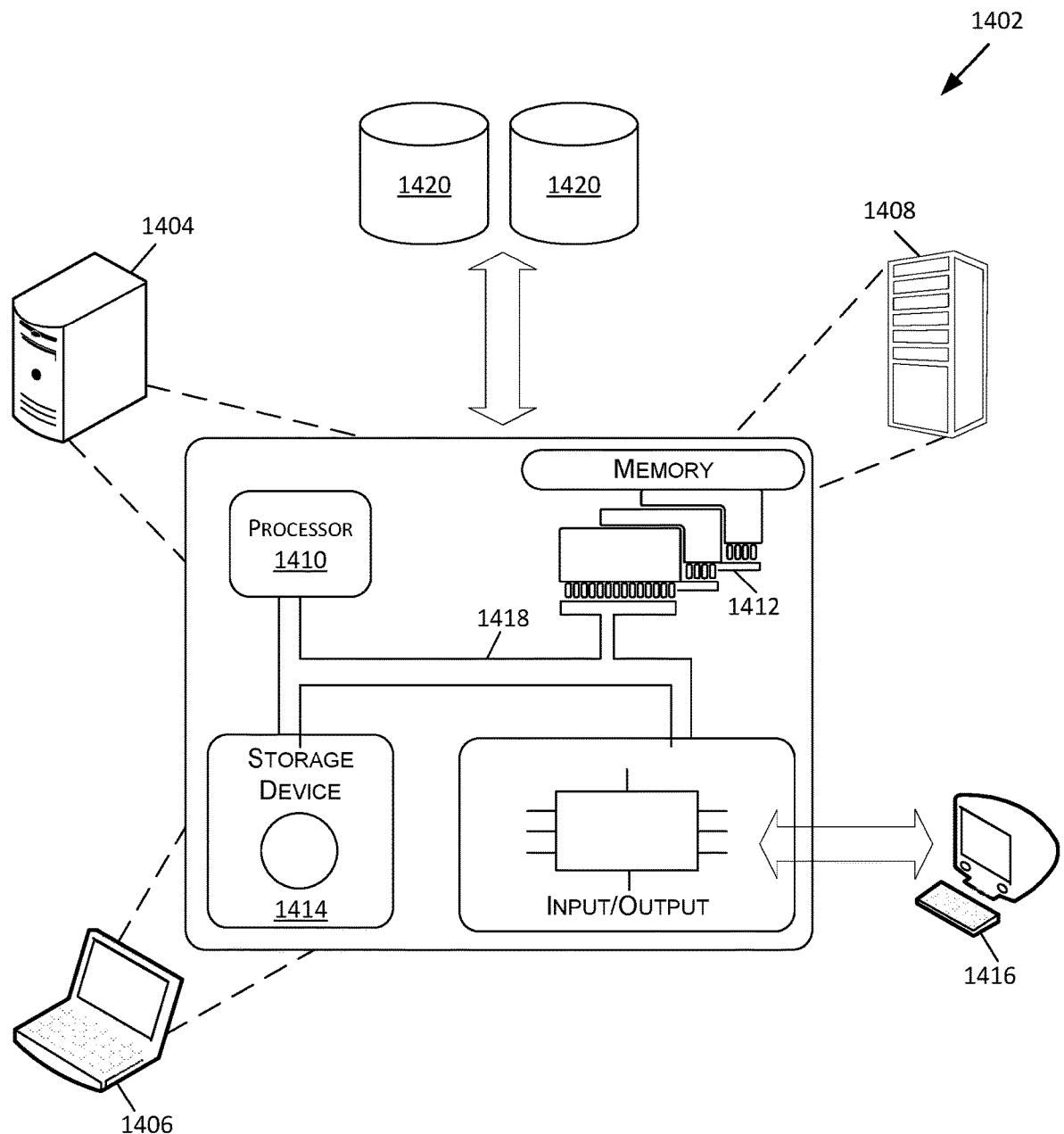
FIG. 14 is a functional block diagram of a general-purpose computing system on which the present embodiments may be implemented according to various aspects of present disclosure.

FIG. 14 is a functional block diagram of a general-purpose computing system on which the present embodiments may be implemented according to various aspects of the present disclosure. The computer system 1402 may be embodied in at least one of a personal computer (also referred to as a desktop computer) 1404, a portable computer (also referred to as a laptop or notebook computer) 1406, and/or a server 1408 is a computer program and/or a machine that waits for requests from other machines or software (clients) and responds to them. A server typically processes data. The purpose of a server is to share data and/or hardware and/or software resources among clients. This architecture is called the client—server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1402 may execute at least some of the operations described above. The computer system 1402 may include at least one processor 1410, memory 1412, at least one storage device 1414, and input/output (I/O) devices 1416. Some or all of the components 1410, 1412, 1414, 1416 may be interconnected via a system bus 1418. The processor 1410 may be single- or multi-threaded and may have one or more cores. The processor 1410 execute instructions, such as those stored in the memory 1412 and/or in the storage device 1414. Information may be received and output using one or more I/O devices 1416.

The memory 1412 may store information, and may be a computer-readable medium, such as volatile or non-volatile memory. The storage device(s) 1414 may provide storage for the system 1402 and, in some embodiments, may be a computer-readable medium. In various aspects, the storage device(s) 1414 may be a flash memory device, a hard disk device, an optical disk device, a tape device, or any other type of storage device.

The I/O devices 1416 may provide input/output operations for the system 1402. The I/O devices 1416 may include a keyboard, a pointing device, and/or a microphone. The I/O devices 1416 may further include a display unit for displaying graphical user interfaces, a speaker, and/or a printer. External data may be stored in one or more accessible external databases 1420.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described embodiments by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a component, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

Example Clauses

In a first aspect, a method is provided, the method comprising: receiving data representative of a visual representation of a property; using the data, displaying, on a display of a client device, the visual representation, the visual representation including a first representation of one or more physical features of the property, a first icon representing a security device at a first location with respect to the first representation, wherein the first location corresponds to an installation location of the security device at the property, and a second icon representing a hub device at a second location with respect to the first representation, wherein the second location corresponds to an installation location of the hub device at the property; and one of: 1) receiving, via the display, a plurality of touch inputs, each of the plurality of touch inputs being along a path from the first location to the second location; and after receiving the plurality of touch inputs, transmitting to at least one of the security device or the hub device, a control signal including a command for the at least one of the security device or the hub device to communicate with the other of the security device or the hub device; or 2) receiving, at a first time, via the display, a first touch input at the first location and receiving, at a second time after the first time, via the display, a second touch input at the second location; and after receiving the first touch input and the second touch input, transmitting to at least one of the security device or the hub device, a control signal including a command for the at least one of the security device or the hub device to communicate with the other of the security device or the hub device.

In an embodiment of the first aspect, transmitting the control signal comprises transmitting an instruction for the security device to transmit authentication information to authenticate the security device with the hub device.

In another embodiment of the first aspect, transmitting the control signal to the security device comprises transmitting at least one of an identification of a network at the property or login information for connecting to the network at the property.

In another embodiment of the first aspect, the method further includes: receiving, from the security device, a signal including location information for the security device; after receiving the signal, determining, based at least in part on the location information, the installation location of the security device at the property; and updating the visual representation to include the first icon representing the security device at the first location with respect to the first representation.

In another embodiment of the first aspect, the method further includes determining the installation location of the security device at the property, wherein determining the installation location comprises at least one of receiving, via an input at the display, an indication of the installation location of the security device at the property, or receiving location information from the security device.

In a second aspect, a method is provided, the method comprising: receiving, at an electronic device, data representative of a property, a first security device, and a second security device; processing the data to display, on a display of the electronic device, a visual representation of the property, a first graphical element representing the first security device at a first location with respect to the visual representation of the property, wherein the first location corresponds to a location of the first security device at the property, and a second graphical element representing the second security device at a second location with respect to the visual representation of the property, wherein the second location corresponds to a location of the second security device at the property; receiving, via the display, a first input at the first location followed by a second input at the second location; after receiving the first and second inputs, displaying, at a third location on the display, a first control element associated with a first setting of the first security device; receiving, via the display, a third input at the third location;

and transmitting, to the first security device, an instruction to configure the first setting of the first security device.

In an embodiment of the second aspect, receiving the first input at the first location followed by the second input at the second location comprises one of: receiving, via the display, a plurality of touch inputs, each of the plurality of touch inputs being along a path from the first location to the second location; or receiving, at a first time, via the display, a first touch input at the first location and receiving, at a second time after the first time, via the display, a second touch input at the second location.

In another embodiment of the second aspect, the instruction to configure the first setting of the first security device includes an indication of at least one setting of the second security device and an instruction to reconfigure the first setting of the first security device according to the at least one setting of the second security device.

In another embodiment of the second aspect, the instruction to configure the first setting of the first security device is an instruction to extend a functionality of the first security device.

In another embodiment of the second aspect: the first security device comprises at least one of a light emitter, a camera, or an audio output device, the second security device includes a motion detector, and the instruction to configure the first setting of the first security device is at least one of an instruction to illuminate the light emitter at the first security device when motion is detected by the motion detector of the second security device, an instruction to begin generating image data using the camera when motion is detected by the motion detector of the second security device, or an instruction to emit audio using the audio output device when motion is detected by the motion detector of the second security device.

In another embodiment of the second aspect, the instruction is a first instruction, the method further comprising transmitting, to the second security device, a second instruction to transmit information indicative of detected motion at the second security device to the first security device.

In a third aspect, a method is provided, the method comprising: displaying, on a display of a client device, a first graphical user interface (GUI) comprising a visual representation of a property, a first representation of a first security device at a first location on the display, and a second representation of a second security device at a second location on the display; receiving a first input at the first location; based at least in part on the first input, displaying, on the display, a second GUI comprising a user interface control element at a third location on the display, the user interface control element being operable to configure one or more settings of the first security device; receiving, via the display, a second input at the third location representative of a request to configure the one or more settings of the security device; and causing a signal to be transmitted to the first security device, the signal representative of an instruction to configure the one or more settings of the security device according to the second input.

In an embodiment of the third aspect, the instruction to configure the one or more settings of the security device comprises an instruction to configure the first security device to communicate with the second security device.

In another embodiment of the third aspect, the method further includes: receiving a signal indicative of a presence of the first security device on the property; and updating the visual representation of the property to include the first representation of the first security device.

In another embodiment of the third aspect, the method further includes: receiving location information from the first security device; and displaying the first graphical representation on the visual representation of the property according to the location information.

In another embodiment of the third aspect, the first security device is a newly-installed security device, the method further comprising receiving at least one of: an instruction to reconfigure at least one first setting of the first security device in accordance with at least one second setting of the second security device, an instruction to communicate with the second security device, or an instruction to transmit device identification information for provisioning of the first security device.

In another embodiment of the third aspect, the instruction to configure the one or more settings includes an indication of at least one setting of the second security device and an instruction to reconfigure at least one setting of the first security device according to the at least one setting of the second security device.

In another embodiment of the third aspect, the at least one setting of the second security device comprises at least one of a wireless networking setting, a recording setting, a notification setting, or a privacy setting.

In another embodiment of the third aspect, the instruction to configure the setting is an instruction to extend a functionality of the first security device.

In another embodiment of the third aspect: the first security device comprises at least one of a light emitter, a camera, or an audio output device, the second security device includes a motion detector, and the instruction to configure the setting is at least one of an instruction to illuminate the light emitter at the first security device based at least in part on motion being detected at the motion detector of the second security device, an instruction to begin generating image data using the camera based at least in part on motion being detected at the motion detector of the second security device, or an instruction to emit audio at the audio output device based at least in part on motion being detected at the motion detector, the method further comprising: transmitting, to the second security device, a second instruction to configure the second security device to transmit information indicative of detected motion at the second security device to the first security device.

What is claimed is:

1. A method comprising:
   sending, to a display, first data representing a visual representation of a property;
   sending, to the display, second data representing a first graphical element, the first graphical element representing a first security device located at a first location on the property;
   sending, to the display, third data representing a second graphical element, the second graphical element representing a second security device located at a second location on the property;
   receiving fourth data representing a first selection of the first graphical element;
   receiving fifth data representing a second selection of the second graphical element;
   based at least in part on the fifth data, sending, to the display, sixth data representing an option to have the second security device configured using the one or more settings of the first security device;
   receiving seventh data representing a third selection of the option; and based at least in part on the receiving of the seventh data, sending, to one or more computing devices, eighth data that causes the one or more computing devices to configure the second security device using one or more settings associated with the first security device.

2. A method comprising:
sending, to a display, first data representing a visual representation of a property;
sending, to the display, second data representing a first graphical element, the first graphical element representing a first security device located at a first location on the property;
sending, to the display, third data representing a second graphical element, the second graphical element representing a second security device located at a second location on the property;
receiving fourth data representing a first selection of the first graphical element;
receiving fifth data representing a second selection of the second graphical element;
based at least in part on the receiving of the fifth data, sending, to the display, sixth data representing a first action for the first security device to perform based at least in part on the second security device detecting a first event or for the second security device to perform based at least in part on the first security device detecting a second event;
receiving seventh data representing a third selection associated with the first action; and
sending, to one or more computing devices, eighth data representing the first action.

3. The method of claim 2, further comprising:
receiving location data associated with the first security device,
wherein the sending of the second data is based at least in part on the location data.

4. The method of claim 2, further comprising sending ninth data associated with reconfiguring a first setting of the first security device according to a second setting of the second security device.

5. The method of claim 4, further comprising determining the second setting, the second setting comprising at least one of:
a wireless networking setting;
a recording setting;
a notification setting; or
a privacy setting.

6. The method of claim 2, further comprising determining the first action, the first action comprising at least one of:
activating a light source;
generating image data using a camera; or
outputting sound using a speaker.

7. The method of claim 2, further comprising sending ninth data that is associated with causing the first security device to communicate with the second security device.

8. The method of claim 2, further comprising sending, to the display, ninth data representing an option to configure a first setting of the first security device according to a second setting of the second security device.

9. The method of claim 1, wherein:
the first security device comprises at least one of:
a first camera device;
a first sensor;
a first hub device; or
a first lighting device; and the second security device comprises at least one of:
a second camera device;
a second sensor;
a second hub device; or
a second lighting device.

10. The method of claim 1, further comprising:
sending, to the display, ninth data representing a third graphical element, the third graphical element representing a first field of view (FOV) of the first security device; and
sending, to the display, tenth data representing a fourth graphical element, the fourth graphical element representing a second FOV of the second security device.

11. The method of claim 1, further comprising:
receiving, from one or more second computing devices, map data associated with a third location, the third location associated with the property; and
generating the first data using at least a portion of the map data.

12. The method of claim 1, further comprising:
receiving ninth data representing a third location associated with the property; and
generating the first data based at least in part on the ninth data.

13. The method of claim 1, further comprising:
receiving ninth data representing a position on the visual representation of the property, the position corresponding to the second location on the property; and
generating the third data based at least in part on the ninth data.

14. The method of claim 2, further comprising sending, to the display, ninth data representing a second action for the first security device to perform based at least in part on the second security device detecting the first event, the second action being different than the first action.

15. The method of claim 1, further comprising, based at least in part on the fifth data, sending, to the at least one of the first security device or the one or more computing devices, a request for the one or more settings.

16. The method of claim 2, wherein the one or more computing devices comprise the first security device.

17. The method of claim 2, wherein the one or more computing devices comprise the second security device.

18. The method of claim 2, wherein the one or more computing devices comprise a server.

19. The method of claim 2, wherein the one or more computing devices comprise a hub device.

20. An electronic device comprising:
a display;
one or more processors; and
one or more computer-readable media storing instructions that, when executed by the one or more processors, cause the electronic device to perform operations comprising:
displaying, using the display, a visual representation of a property;
displaying, using the display, a first graphical element representing a first security device located at a first location on the property;
displaying, using the display, a second graphical element representing a second security device located at a second location on the property;
receiving a first input selecting the first graphical element;
receiving a second input selecting the second graphical element;
based at least in part on the receiving of the second input, displaying, using the display, an option to have the first security device configured using the one or more settings of the second security device;

receiving a third input selecting the option; and based at least in part on the receiving of the third input, sending, to one or more computing devices, first data that causes the one or more computing devices to configure the first security device using one or more settings associated with the second security device.

21. The electronic device of claim 20, the one or more computer-readable media storing further instructions that, when executed by the one or more processors, cause the electronic device to perform further operations comprising:

receiving, a fourth input indicating the first location of the first security device on the property, wherein the displaying of the first graphical element is based at least in part on the fourth input; and receiving, a fifth input indicating the second location of the second security device on the property, wherein the displaying of the second graphical element is based at least in part on the fifth input.

* * * * *